US012684338B2

(12) United States Patent
Agrawal et al.

(10) Patent No.: US 12,684,338 B2
(45) Date of Patent: Jul. 14, 2026

(54) STEERING UE CAPABILITY INFORMATION BASED ON NETWORK CAPABILITY FEATURES

(71) Applicant: QUALCOMM Incorporated, San Diego, CA (US)

(72) Inventors: Mona Agrawal, San Diego, CA (US); Arvind Vardarajan Santhanam, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/484,983

(22) Filed: Oct. 11, 2023

(65) Prior Publication Data

US 2024/0137755 A1 Apr. 25, 2024
US 2024/0236654 A9 Jul. 11, 2024

Related U.S. Application Data

(60) Provisional application No. 63/380,368, filed on Oct. 20, 2022.

(51) Int. Cl.
*H04W 8/24* (2009.01)
*H04W 48/16* (2009.01)

(52) U.S. Cl.
CPC ............. *H04W 8/24* (2013.01); *H04W 48/16* (2013.01)

(58) Field of Classification Search
CPC .......... H04W 48/16; H04W 8/22; H04W 8/24
See application file for complete search history.

(56) References Cited

U.S. PATENT DOCUMENTS

| | | | | |
|---|---|---|---|---|
| 11,617,077 B2 * | 3/2023 | Kolekar | ................. | H04W 8/24 |
| | | | | 713/181 |
| 2019/0110190 A1 * | 4/2019 | Van Lieshout | ......... | H04W 8/24 |
| 2020/0092879 A1 * | 3/2020 | Wu | ........................ | H04W 8/005 |
| 2021/0360729 A1 * | 11/2021 | Yiu | ........................ | H04W 76/27 |
| 2022/0360974 A1 * | 11/2022 | Palle Venkata | ......... | H04W 8/24 |
| 2023/0337313 A1 * | 10/2023 | Yi | ........................ | H04L 5/0094 |

\* cited by examiner

*Primary Examiner* — Congvan Tran
(74) *Attorney, Agent, or Firm* — Procopio, Cory, Hargreaves & Savitch

(57) ABSTRACT

A method of wireless communication at a UE is disclosed herein. The method includes receiving a first message including a first IE that indicates a set of first features supported by a first network node. The method includes transmitting, for the first network node, a second message including first UE capability information of the UE based on the first IE included in the first message, where the first UE capability information includes a subset of the set of first features supported by the first network node.

27 Claims, 20 Drawing Sheets

FIG. 6

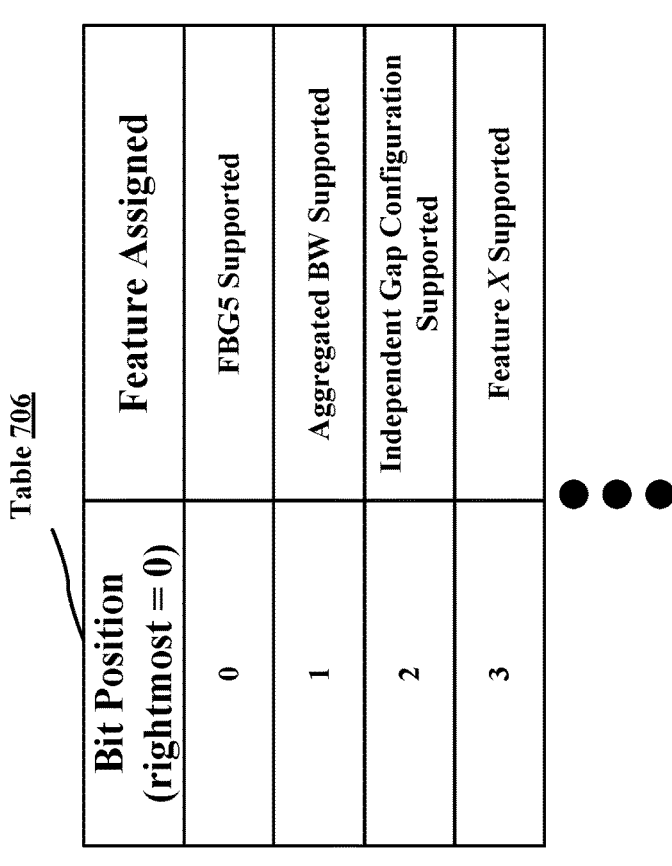

Table 706

| Bit Position (rightmost = 0) | Feature Assigned |
|---|---|
| 0 | FBG5 Supported |
| 1 | Aggregated BW Supported |
| 2 | Independent Gap Configuration Supported |
| 3 | Feature X Supported |

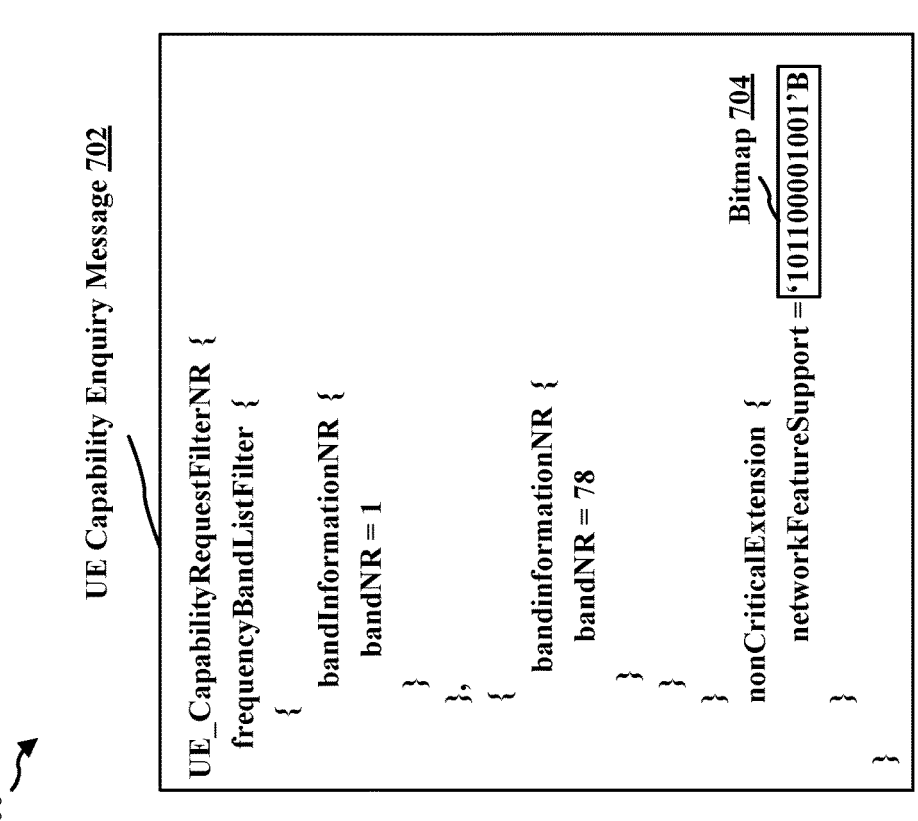

UE Capability Enquiry Message 702

UE_CapabilityRequestFilterNR  {
frequencyBandListFilter  {
{
bandInformationNR  {
bandNR = 1
~~,
bandinformationNR  {
bandNR = 78
~~,
nonCriticalExtension  {
networkFeatureSupport = '1011000001001'B    Bitmap 704
~~

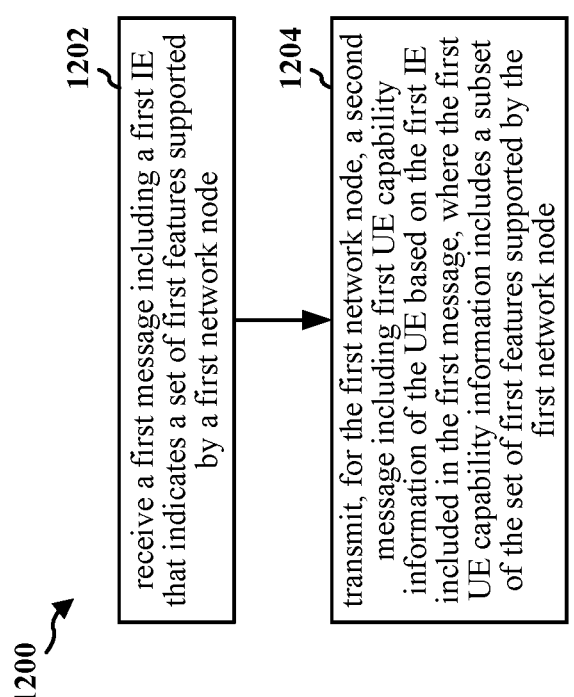

1200

1202
receive a first message including a first IE that indicates a set of first features supported by a first network node 1204
transmit, for the first network node, a second message including first UE capability information of the UE based on the first IE included in the first message, where the first UE capability information includes a subset of the set of first features supported by the first network node

FIG. 12

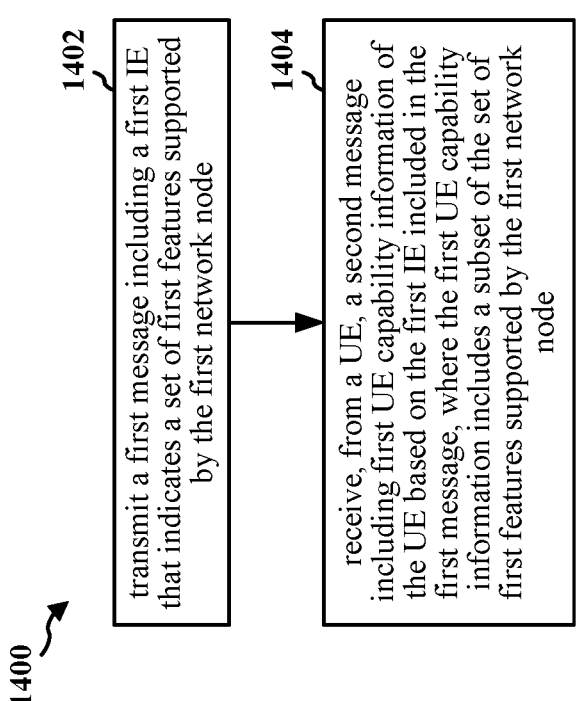

1400

1402 transmit a first message including a first IE that indicates a set of first features supported by the first network node

1404 receive, from a UE, a second message including first UE capability information of the UE based on the first IE included in the first message, where the first UE capability information includes a subset of the set of first features supported by the first network node

FIG. 14

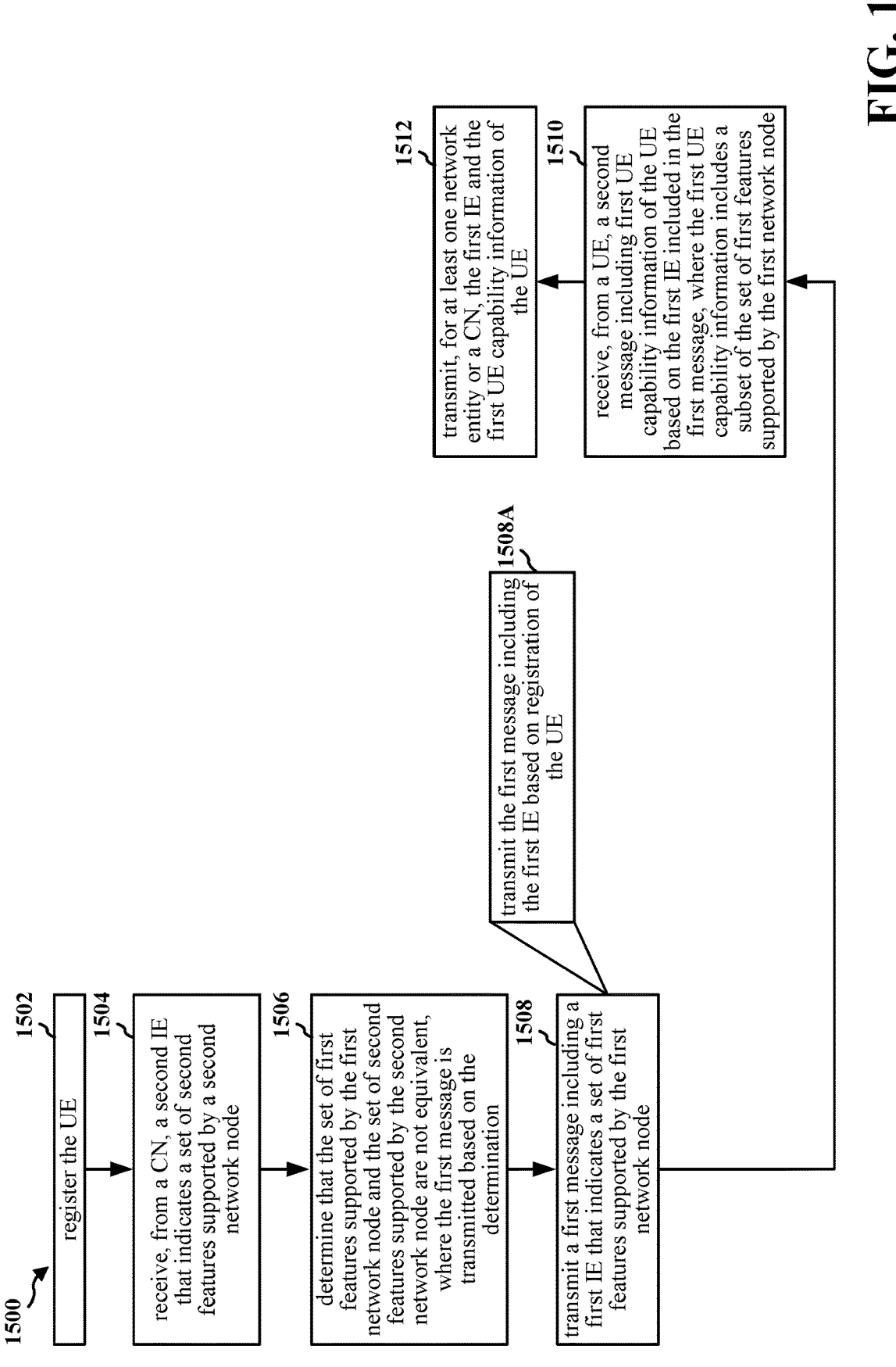

1500

1502 register the UE

1504 receive, from a CN, a second IE that indicates a set of second features supported by a second network node

1506 determine that the set of first features supported by the first network node and the set of second features supported by the second network node are not equivalent, where the first message is transmitted based on the determination

1508 transmit a first message including a first IE that indicates a set of first features supported by the first network node

1508A transmit the first message including the first IE based on registration of the UE

1512 transmit, for at least one network entity or a CN, the first IE and the first UE capability information of the UE

1510 receive, from a UE, a second message including first UE capability information of the UE based on the first IE included in the first message, where the first UE capability information includes a subset of the set of first features supported by the first network node

FIG. 15

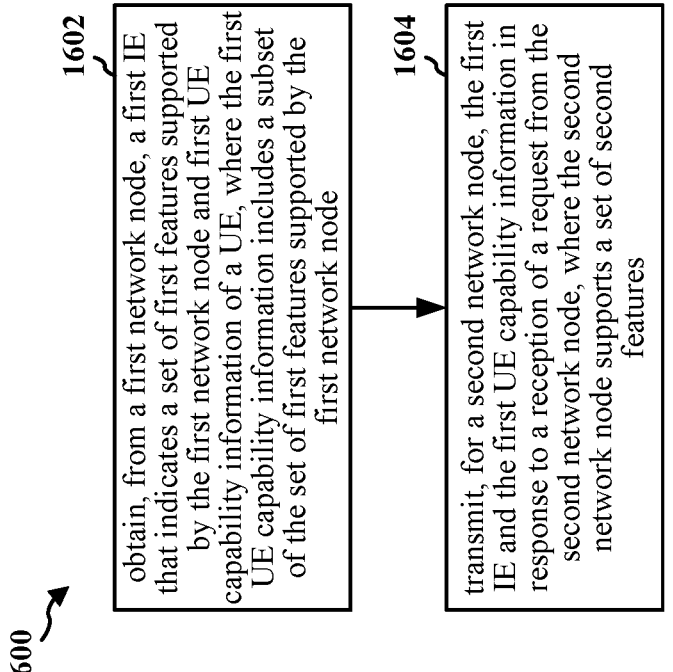

1600

1602 obtain, from a first network node, a first IE that indicates a set of first features supported by the first network node and first UE capability information of a UE, where the first UE capability information includes a subset of the set of first features supported by the first network node

1604 transmit, for a second network node, the first IE and the first UE capability information in response to a reception of a request from the second network node, where the second network node supports a set of second features

FIG. 16

STEERING UE CAPABILITY INFORMATION BASED ON NETWORK CAPABILITY FEATURES

CROSS REFERENCE TO RELATED APPLICATION(S)

This application claims the benefit of and priority to U.S. Provisional Application Ser. No. 63/380,368, entitled "STEERING UE CAPABILITY INFORMATION BASED ON NETWORK CAPABILITY FEATURES" and filed on Oct. 20, 2022, which is expressly incorporated by reference herein in its entirety.

TECHNICAL FIELD

The present disclosure relates generally to communication systems, and more particularly, to features supported by a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes at least one memory and at least one processor coupled to the at least one memory and, based at least in part on information stored in the at least one memory, the at least one processor, individually or in any combination, is configured to: receive a first message including a first information element (IE) that indicates a set of first features supported by a first network node; and transmit, for the first network node, a second message including first UE capability information of the UE based on the first IE included in the first message, where the first UE capability information includes a subset of the set of first features supported by the first network node.

In an aspect of the disclosure, a method, a computer-readable medium, and an apparatus for wireless communication at a first network node are provided. The apparatus includes at least one memory and at least one processor coupled to the at least one memory and, based at least in part on information stored in the at least one memory, the at least one processor, individually or in any combination, is configured to: transmit a first message including a first information element (IE) that indicates a set of first features supported by the first network node; and receive, from a user equipment (UE), a second message including first UE capability information of the UE based on the first IE included in the first message, where the first UE capability information includes a subset of the set of first features supported by the first network node.

In an aspect of the disclosure, a method, a computer-readable medium, and an apparatus for wireless communication at a network entity are provided. The apparatus includes at least one memory and at least one processor coupled to the at least one memory and, based at least in part on information stored in the at least one memory, the at least one processor, individually or in any combination, is configured to: obtain, from a first network node, a first information element (IE) that indicates a set of first features supported by the first network node and first user equipment (UE) capability information of a UE, where the first UE capability information includes a subset of the set of first features supported by the first network node; and transmit, for a second network node, the first IE and the first UE capability information in response to a reception of a request from the second network node, where the second network node supports a set of second features.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating examples of features supported by a base station and features supported by a UE.

FIG. 7 is a diagram illustrating an example of a UE capability enquiry message that includes a bitmap that indicates network feature support.

FIG. 12 is a flowchart of a method of wireless communication.

FIG. 14 is a flowchart of a method of wireless communication.

FIG. 15 is a flowchart of a method of wireless communication.

FIG. 16 is a flowchart of a method of wireless communication.

DETAILED DESCRIPTION

Figure 1:
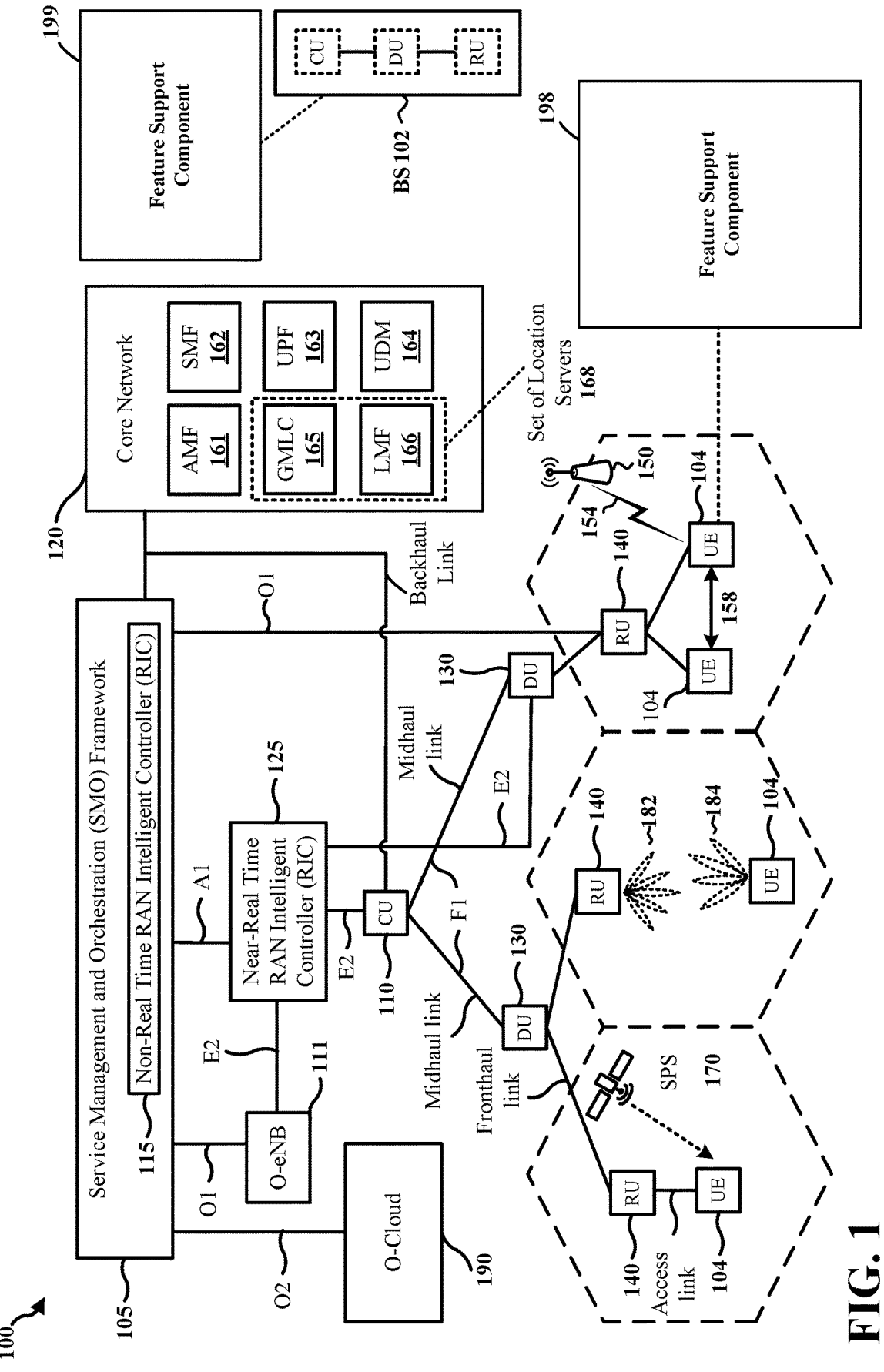
FIG. 1 is a diagram illustrating an example of a wireless communications system and an access network.

A base station and a UE may be configured with a first set of features and a second set of features, respectively, that facilitate wireless communications between the base station and the UE. The first set of features and the second set of features may vary. The base station may transmit a UE capability enquiry to the UE that may include an indication of the first set of features. The UE may transmit UE capability information to the base station that may indicate the second set of features supported by the UE. In an example, the UE capability information may include an indication of whether or not each feature in the first set of features and/or the second set of features is supported by the UE. This may lead to a message size of the UE capability information becoming relatively large. Processing the UE capability information may be time consuming due to the large message size. Furthermore, storing the UE capability information may be burdensome due to the relatively large message size. Various technologies pertaining to steering UE capability information based on network capability features are described herein. In an example, a UE receives a first message including a first IE that indicates a set of first features supported by a first network node. The UE transmits, for the first network node, a second message including first UE capability information of the UE based on the first IE included in the first message, where the first UE capability information includes a subset of the set of first features supported by the first network node. Vis-à-vis selectively advertising the second set of features based on the first IE (e.g., not advertising features of the UE that are not supported by the first network node), a size of the second message may be reduced. Thus, the above-described technologies may be associated with reduced storage characteristics and reduced processing times at both the UE and the first network node.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a feature support component 198 that is configured to receive a first message including a first IE that indicates a set of first features supported by a first network node; and transmit, for the first network node, a second message including first UE capability information of the UE based on the first IE included in the first message, where the first UE capability information includes a subset of the set of first features supported by the first network node. In certain aspects, the base station 102 may include a feature support component 199 that is configured to transmit a first message including a first IE that indicates a set of first features supported by the first network node; and receive, from a UE, a second message including first UE capability information of the UE based on the first IE included in the first message, where the first UE capability information includes a subset of the set of first features supported by the first network node. Although the following description may be focused on 5G NR, the concepts described herein may be applicable to other similar areas, such as LTE, LTE-A, CDMA, GSM, and other wireless technologies.

Figures 2A, 2B, 2C, 2D:
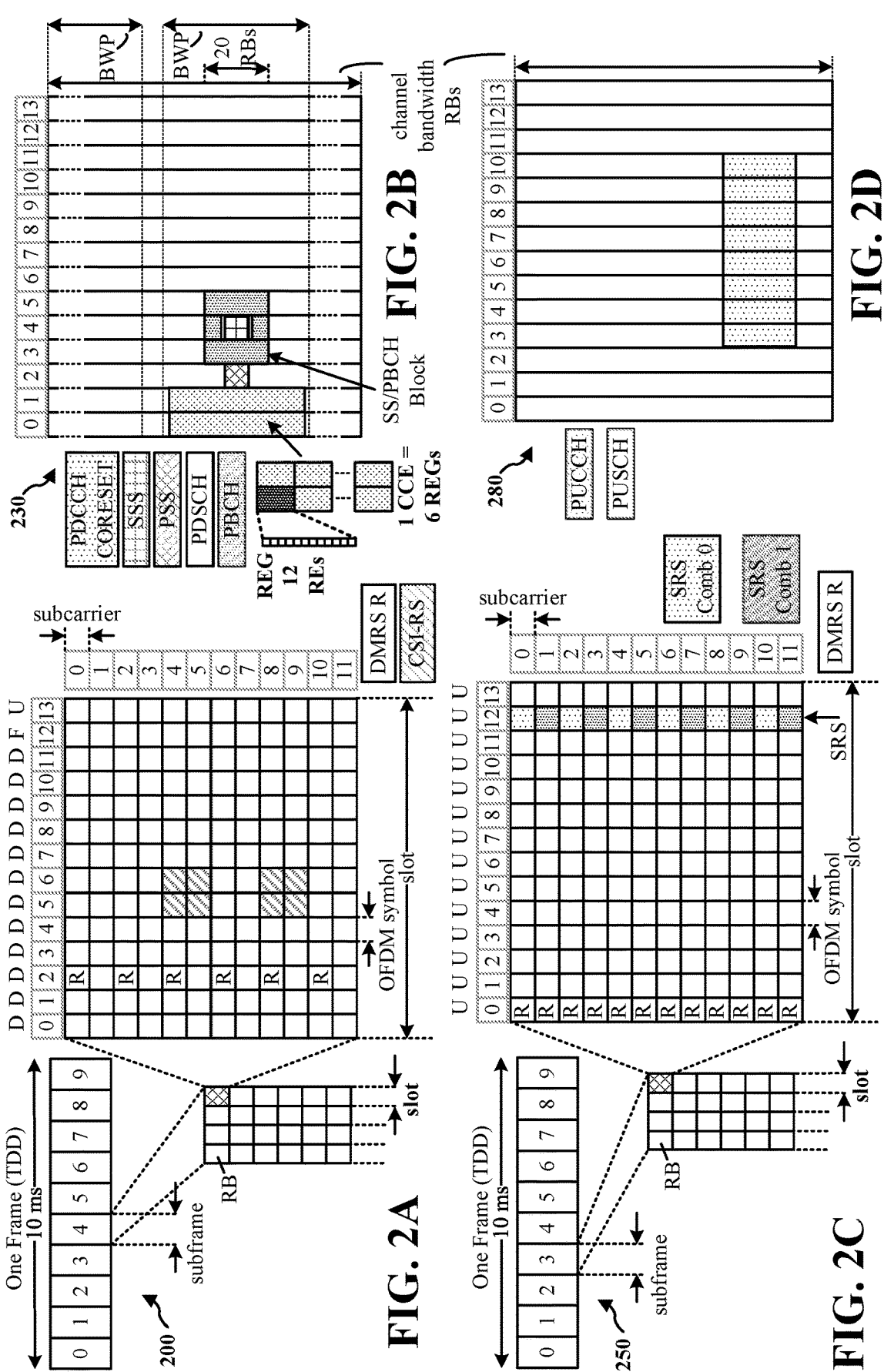
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
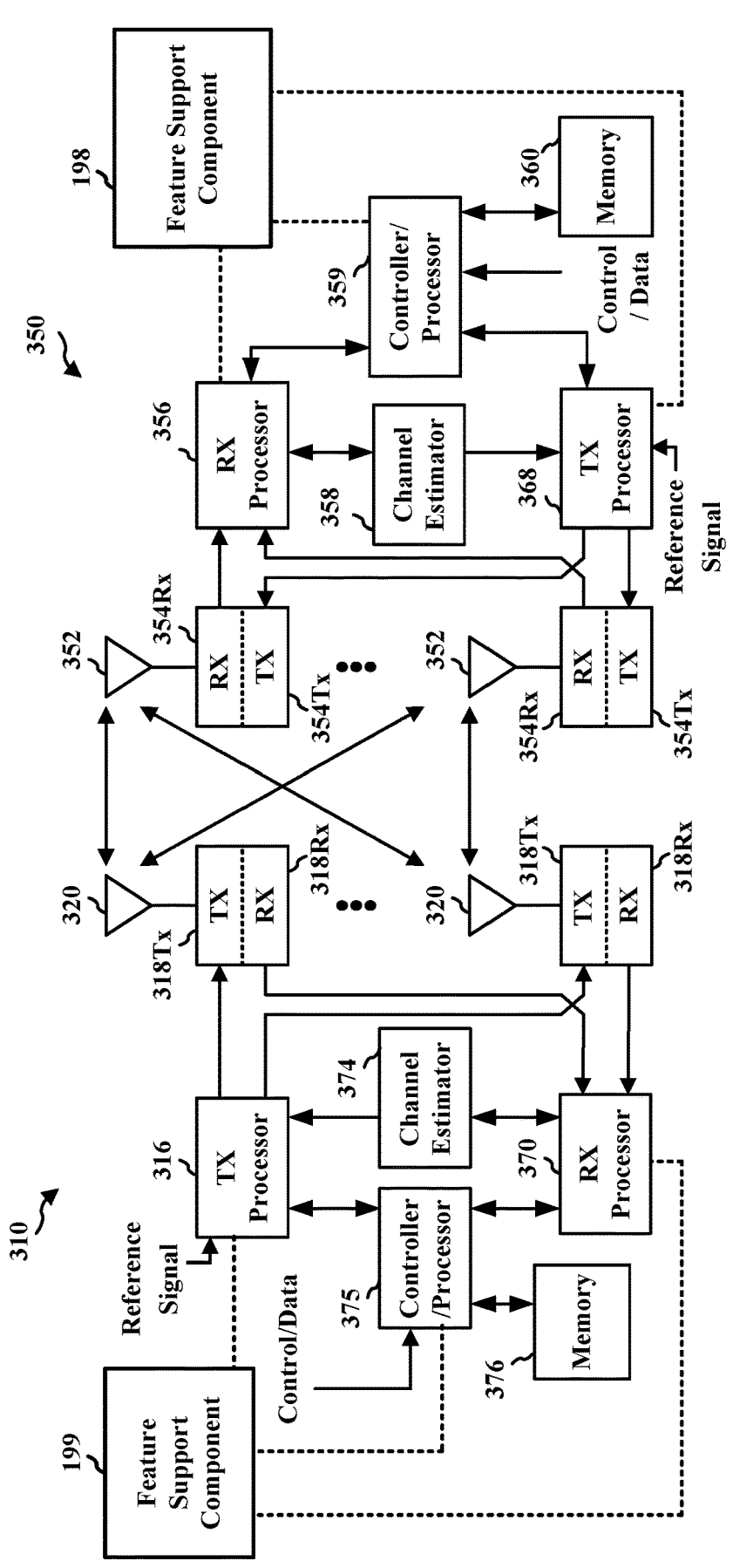
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TB s, demultiplexing of MAC SDUs from TB s, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the feature support component 198 of FIG. 1.

At least one of the TX processor 316, the RX processor 370, and the controller/processor 375 may be configured to perform aspects in connection with the feature support component 199 of FIG. 1.

Figure 4:
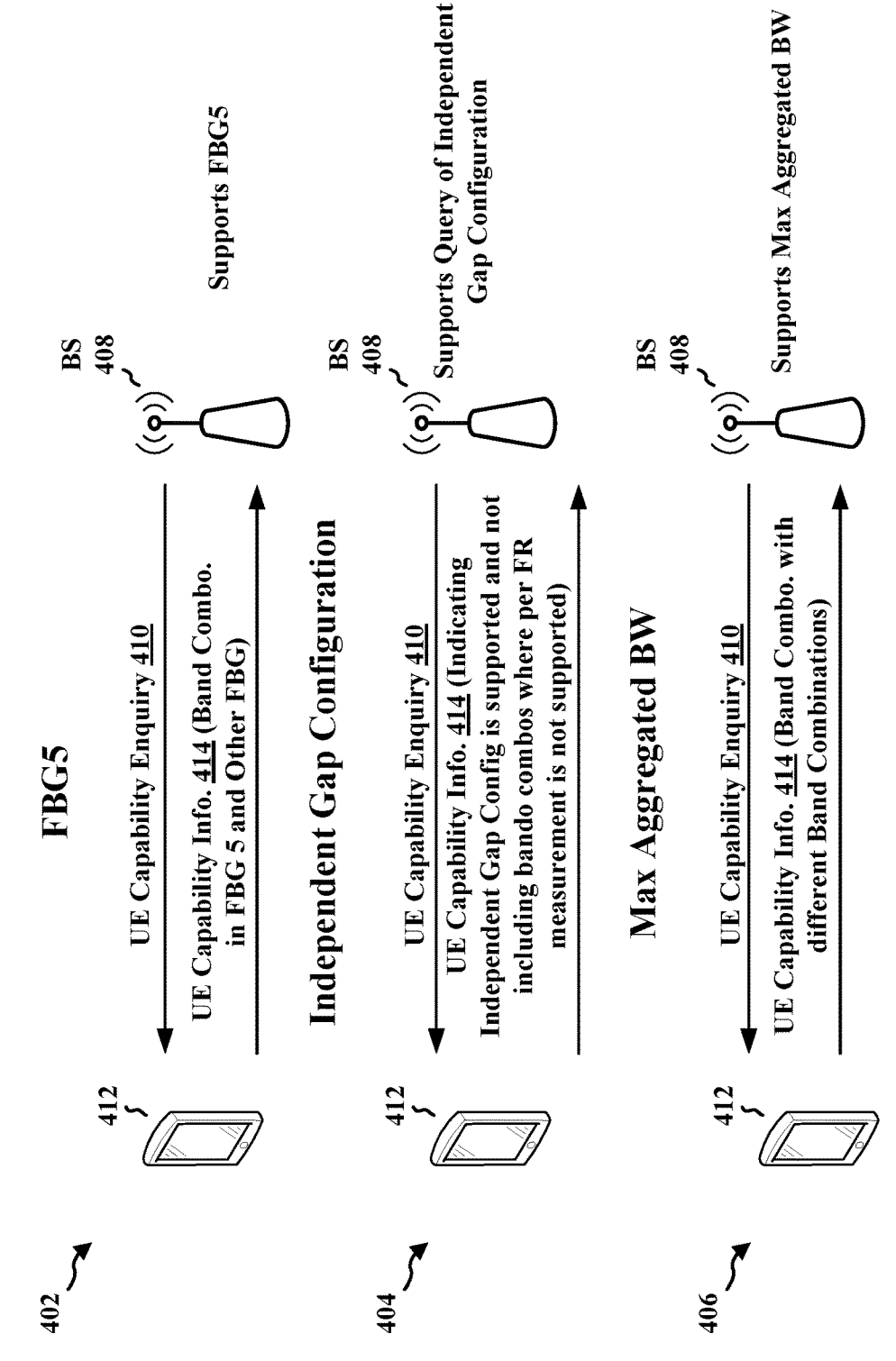
FIG. 4 is a diagram illustrating examples of UE capability enquiries being transmitted by a base station and UE capability information being transmitted by a UE.

FIG. 4 is a diagram 400 illustrating examples of UE capability enquiries being transmitted by a base station and UE capability information being transmitted by a UE. A base station and a UE may be configured with a first set of features and a second set of features, respectively, that facilitate wireless communications between the base station and the UE. In an example, the first set of features and/or the second set of features may be specified/defined/promulgated by 3GPP. In some instances, the first set of features and the second set of features may be equivalent. In other instances, the first set of features and the second set of features may differ by one or more features. In an example, the first set of features may include a first feature and the second set of features may include a second feature, where the first feature is an updated version of the second feature or where the second feature is an updated version of the first feature. In another example, the first set of features may include a first feature that is omitted from the second set of features or vice versa. The base station and the UE may exchange communications in order for the base station and the UE to become informed of their respective support for different features.

In a first example 402, a base station 408 (e.g., a gNB) may support fallback group five (FBG5) functionality (i.e., a feature). A fallback group (FBG) may refer to a group of carrier aggregation bandwidth classes for which a UE may fallback to in order to lower an order of a CA bandwidth class configuration. A UE may not fallback to a lower order bandwidth class configuration that belongs to a different fallback group. FBG5 may refer to a FBG that includes bandwidth classes with up to 2400 MHz aggregated bandwidth with 12 carriers. The bandwidth classes of FBG5 may be associated with FR2. The bandwidth classes of FBG5 may be referred to as R2-R12. The bandwidth classes may allow for a mix of 100 MHz and 200 MHz wide component carriers. In an example, an R8 bandwidth class may have eight contiguous component carriers that include a mix of 100 MHz and 200 MHz wide component carriers. The bandwidth classes of FBG5 may be different than bandwidth classes from other FB Gs due to an aggregated channel bandwidth range overlapping between adjacent bandwidth classes.

The base station 408 may transmit a UE capability enquiry 410 to a UE 412. The UE 412 may transmit UE capability information 414 to the base station 408 based on receiving the UE capability enquiry 410. In an example, the UE capability information 414 may include an indication of frequency band combination(s) associated with FBG5 and frequency band combination(s) associated with other FBGs when the UE 412 supports FBG5 as the UE 412 may not be informed as to whether a network supports the other FBGs, FBG5, or the other FBGs and FGB5. In an example, the UE 412 may support FBG5 and the UE 412 may report band combinations associated with FBG5. The UE capability information 414 may be included in a message that is relatively large due to the message including the frequency band combination(s) associated with FBG5 and the frequency band combination(s) associated with the other FBGs. Furthermore, the UE 412 and/or the base station 408 may take a relatively long time to process the message due to the message including the frequency band combination(s) associated with FBG5 and the frequency band combination (s) associated with the other FBGs. Additionally, storing the message may take a relatively large amount of memory storage space due to the message including the frequency band combination(s) associated with FBG5 and the frequency band combination(s) associated with the other FBGs.

In a second example 404, the base station 408 may support query for independent gap configuration functionality (i.e., a feature). Independent gap configuration functionality may refer to whether a UE supports two independent measurement gap configurations for FR1 and FR2. For instance, a UE that is configured with independent gap configuration functionality may not be configured with a gap on a serving cell associated with FR1 in order to measure frequency associated with FR2. A UE may be configured with independent gap configuration functionality on a per-band basis. Independent gap configuration functionality may also be referred to as per-frequency range (per-FR) functionality. A measurement gap may refer to an occasion in which a UE may perform one or more measurements on a reference signal associated with a non-serving cell and during which the UE may refrain from transmitting or receiving data from a serving cell. Independent gap configuration functionality may also be referred to as "independentGapConfig." Query for independent gap configuration functionality may refer to whether the base station 408 is able to query the UE 412 as to whether the UE supports the independent gap configuration functionality.

The base station 408 may transmit the UE capability enquiry 410 to the UE 412. The UE 412 may transmit the UE capability information 414 to the base station 408 based on receiving the UE capability enquiry 410. In an example, the UE capability information 414 may indicate that the UE 412 supports the independent gap configuration functionality. However, the UE capability information 414 may not include frequency band combinations where a per-frequency range (FR) measurement is not supported. As a result, the base station 408 may not be able to configure higher order component carrier (CC) band combinations based on the UE capability information 414. This may lead to lower spectrum utilization and lower performance (e.g., lower throughput) at the UE 412.

In a third example 406, the base station 408 may support maximum aggregated bandwidth functionality (i.e., a feature). Maximum aggregated bandwidth may refer to a maximum aggregated bandwidth across multiple CCs that a band combination supports. Maximum aggregated bandwidth may also be referred to as "maxAggregatedBW."

The base station 408 may transmit the UE capability enquiry 410 to the UE 412. The UE 412 may transmit the UE capability information 414 to the base station 408 based on receiving the UE capability enquiry 410. In an example, the UE capability information 414 may include band combinations with different bandwidth combinations. For instance, the band combinations with the different bandwidth combinations may indicate combinations of bandwidths on each CC that total up to a maximum aggregated bandwidth supported by the UE 412. The UE 412 may not have information pertaining to whether or a not a network supports decoding and processing of a maximum aggregated bandwidth parameter. In an example, if a maximum aggregated bandwidth is 140 MHz (i.e., "maxAggregatedBW=140") and there are two CCs in the band combination, the 140 MHz may be split between the two CCs in different bandwidth combinations such as 100+40, 80+60, 60+80, and 40+100. The UE capability information 414 may be included in a message that is relatively large due to the message including the band combinations with different bandwidth combinations. Furthermore, the UE 412 and/or the base station 408 may take a relatively long time to process the message due to the message including the band combinations with different bandwidth combinations. Additionally, storing the message may take a relatively large amount of memory storage space due to the message including the band combinations with different bandwidth combinations.

As noted above, a base station and a UE may be configured with a first set of features and a second set of features, respectively, that facilitate wireless communications between the base station and the UE. The first set of features and the second set of features may vary. The base station may transmit a UE capability enquiry to the UE that may include an indication of the first set of features. The UE may transmit UE capability information to the base station that may indicate the second set of features supported by the UE. In an example, the UE capability information may include an indication of whether or not each feature in the first set of features and/or the second set of features is supported by the UE. This may lead to a message size of the UE capability information becoming relatively large. For instance, when a network is communicating a set of features supported by the network, a UE may align/optimize UE capability information based on an intersection of the set of features supported by the network and UE supported features. Processing the UE capability information may be time consuming due to the large message size. Furthermore, storing the UE capability information may be burdensome due to the relatively large message size.

Various technologies pertaining to steering UE capability information based on network capability features are described herein. In an example, a UE receives a first message including a first IE that indicates a set of first features supported by a first network node. The UE transmits, for the first network node, a second message including first UE capability information of the UE based on the first IE included in the first message, where the first UE capability information includes a subset of the set of first features supported by the first network node. Vis-à-vis selectively advertising the second set of features based on the first IE (e.g., not advertising features of the UE that are not supported by the first network node), a size of the second message may be reduced. For instance, the size of the second message may be reduced as the UE may not report each possible combination of features supported by different types of network nodes (e.g., gNBs). Instead, the UE may report features that are supported by the first network node. Thus, the above-described technologies may be associated with reduced storage characteristics and reduced processing times at both the UE and the first network node.

In one aspect, UE capability of a UE may be queried via a general UECapabilityEnquiry message and the UE may report UE capability via a UECapabilityInfo message. In such an aspect, the UECapabilityInfo message may be relatively large. In an example, the UECapabilityInfo may have redundant and/or missing information due to the UE not being aware of features (i.e., capabilities) provided by a gNB. As described herein, a UE may be aware of capabilities provided by the gNB, and the UE may tailor reporting in the UECapabilityInfo message based on capabilities supported by the gNB. In an example, if the UE is aware that FBG5 is supported at the gNB, the UE may report a band combination in FBG5 and not in another FBG, and thus may reduce a size of the UECapabilityInfo message (i.e., save bits). In another example, if the UE is aware that queryIndependentGapConfig is supported by the gNB, the UE may include band combinations where per frequency measurement is not supported. In a further example, if the UE knows that maxAggregatedBW is supported by the gNB, the UE may more intelligently report capability regarding band combinations, and thus may reduce a size of the UECapabilityInfo message (i.e., save bits).

Figure 5:
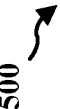
FIG. 5 is a diagram illustrating an example of a UE capability enquiry message transmitted by a base station and a UE capability message transmitted by a UE.

FIG. 5 is a diagram 500 illustrating an example of a UE capability enquiry message 502 transmitted by a base station 504 (e.g., a gNB) and a UE capability message 506 transmitted by a UE 508. The base station 504 may transmit the UE capability enquiry message 502 to the UE 508 after the UE 508 has registered with the base station 504. The UE capability enquiry message 502 may be associated with a generic framework that enables the base station 504 to indicate supported features to the UE 508. The UE capability enquiry message 502 may include an information element (IE) 510. The IE 510 may include indications of features supported by the base station 504 ("BS supported features 512"). In an example, the BS supported features 512 may include FBG5 functionality, query for independent gap configuration functionality, maximum aggregated bandwidth functionality, an/or another feature or features. The IE 510 may be referred to as "Network Feature Support," "networkFeatureSupport," and/or "NF S." The term "IE" may refer to a group of information which may be included within a signaling message or a data flow which is sent across an interface.

In an example, the IE 510 may be or include a bitmap (e.g., a long bitmap), where each bit in the bitmap may be assigned to a different feature, and where a value of each bit may indicate whether or not the base station 504 supports a feature. For instance, a bit may have a value of "0" if the base station 504 does not support a feature and the bit may have a value of "1" if the base station 504 supports the feature. In an example, new bits may be added to the bitmap to represent new features specified/defined/promulgated by 3GPP.

The UE 508 may determine UE capability information 514 based upon receiving the UE capability enquiry message 502. For instance, the UE 508 may determine the UE capability information 514 based on the indications of the BS supported features 512 included in the IE 510 of the UE capability enquiry message 502. Stated differently, the UE 508 may determine which features (i.e., capabilities) to advertise to the base station 504 based on the indications of the BS supported features 512 included in the IE 510 of the UE capability enquiry message 502. In one example, the UE 508 may limit or extend a list of band combinations based on the indications of the BS supported features 512 included in the IE 510 of the UE capability enquiry message 502. In another example, the UE 508 may indicate a substitute feature for a feature (e.g., "IndependentGapConfig") as being supported when the base station 504 (or a network) does not support a more recent version of the feature. Aspects of determining the UE capability information 514 are described in greater detail below. The UE capability information 514 may include indications of features supported by the UE 508 ("UE supported features 516"). In an example, the UE supported features 516 may include FBG5 functionality, independent gap configuration functionality, maximum aggregated bandwidth functionality, an/or another feature or features.

The UE 508 may transmit the UE capability message 506 to the base station 504. The UE capability message 506 may include the UE capability information 514, which, as noted above, may include indications of the UE supported features 516. The UE capability message 506 may also include the IE 510 that was included in the UE capability enquiry message 502. Stated differently, the UE 508 may "reflect" the IE 510 to the base station 504. As noted above, the IE 510 may include the indications of the BS supported features 512. The UE 508 and the base station 504 may then communicate based on the UE capability information 514 included in the UE capability message 506. For instance, the UE 508 and the base station 504 may communicate using the UE supported features 516.

Figure 6:
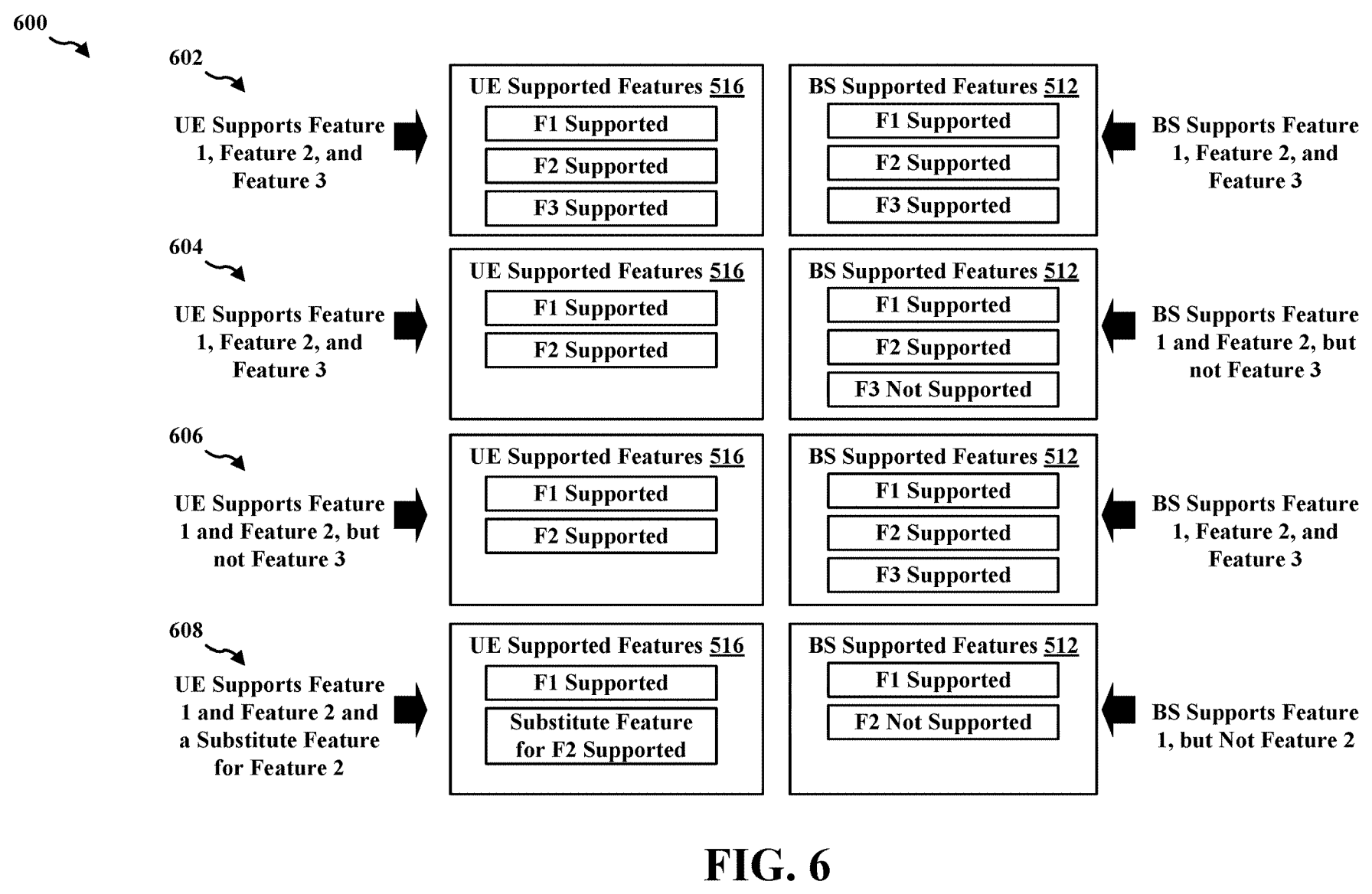

FIG. 6 is a diagram 600 illustrating examples of features supported by a base station and features supported by a UE. In a first example 602, the base station 504 and the UE 508 may each support a first feature (e.g., FBG5 functionality), a second feature (e.g., independent gap configuration functionality), and a third feature (e.g., max aggregated bandwidth functionality). As such, the indications of the BS supported features 512 included in the UE capability enquiry message 502 may indicate that the first feature ("F1") is supported, the second feature ("F2") is supported, and the third feature ("F3") is supported. The UE 508 may determine features that are to be included in the UE supported features 516 based on the BS supported features 512. As the UE 508 supports the first feature, the second feature, and the third feature indicated by the BS supported features 512, the indications of the UE supported features 516 included in the UE capability message 506 may indicate that F1, F2, and F3 are supported by the UE 508. As result, the UE capability message 506 that includes the indications of the UE supported features 516 may be associated with a smaller size and reduced storage characteristics due to the UE supported features 516 indicating features that are supported by both the UE 508 and a network and not indicating features that are not supported by the network.

In a second example 604, the base station 504 may support the first feature and the second feature; however, the base station 504 may not support the third feature. The UE 508 may support the first feature, the second feature, and the third feature. The indications of the BS supported features 512 included in the UE capability enquiry message 502 may indicate that the first feature ("F1") and the second feature ("F2") are supported, but that the third feature ("F3") is not supported. The UE 508 may determine features that are to be included in the UE supported features 516 based on the BS supported features 512. For instance, the UE 508 may determine that the indications of the UE supported features 516 may indicate that F1 is supported and F2 is supported. However, as the base station 504 does not support F3, the UE 508 may not include an indication of support for F3 in the UE supported features 516. As a result, the UE capability message 506 that includes the indications of the UE supported features 516 may be associated with a smaller size and reduced storage characteristics due to the UE capability message 506 not including an indication as to whether F3 is supported by the UE 508.

In a third example 606, the base station 504 may support the first feature, the second feature, and the third feature. The UE 508 may support the first feature and the second feature, but not the third feature. The indications of the BS supported features 512 included in the UE capability enquiry message

502 may indicate that the first feature ("F1") is supported, the second feature ("F2") is supported, and the third feature ("F3") is supported. The UE 508 may determine features that are to be included in the UE supported features 516 based on the BS supported features 512. For instance, the UE 508 may determine that the indications of the UE supported features 516 may indicate that F1 is supported and F2 is supported. However, as the UE 508 does not support F3, the UE 508 may not include an indication of support for F3 in the UE supported features 516. As a result, the UE capability message 506 that includes the indications of the UE supported features 516 may be associated with a smaller size and reduced storage characteristics due to the UE capability message 506 not including an indication as to whether F3 is supported by the UE 508.

In a fourth example 608, the base station 504 may support the first feature, but not the second feature. The UE 508 may support the first feature and the second feature. The indications of the BS supported features 512 included in the UE capability enquiry message 502 may indicate that the first feature ("F1") is supported and the second feature ("F2") are supported. The UE 508 may determine features that are to be included in the UE supported features 516 based on the BS supported features 512. For instance, the UE 508 may determine that the indications of the UE supported features 516 may indicate that F1 is supported. Furthermore, the UE 508 may determine that although the base station 504 does not support the second feature, an indication of a substitute feature for the second feature is to be included in the UE supported features 516. In an example, the substitute feature may be an older version of the second feature.

FIG. 7 is a diagram 700 illustrating an example of a UE capability enquiry message 702 that includes a bitmap 704 that indicates network feature support. In an example, the UE capability enquiry message 702 may be or include the UE capability enquiry message 502. The bitmap 704 may be a long bitmap. Each bit in the bitmap 704 may be assigned to a different feature and a value of each bit may indicate whether or not the base station 504 supports a feature. For instance, a bit may have a value of "0" if the base station 504 does not support a feature and the bit may have a value of "1" if the base station 504 supports the feature. In an example, new bits may be added to the bitmap 704 to represent new features specified/defined/promulgated by 3GPP. In another example, a bit (or bits) in the bitmap 704 that were not previously assigned to a feature may be assigned to a new feature.

A base station (e.g., the base station 504) may maintain a table 706 that may indicate bit positions assigned to particular features. For example, a position of "0" (i.e., a rightmost position) may be assigned to FBG5 functionality, a position of "1" may be assigned to aggregated bandwidth (BW) functionality, a position of "2" may be assigned to query for independent gap configuration functionality, and a position of "3" may be assigned to a feature X. The feature X may be a feature specified/defined/promulgated by 3GPP. In an example with reference to the bitmap 704 and the table 706, the base station may support FBG5 functionality (as the bit in position zero is "1") and feature X (as the bit in position three is "1"). The base station may not support aggregated BW functionality (as the bit in position one is "0") or query for independent gap configuration functionality (as the bit in position two is "0").

Figure 8:
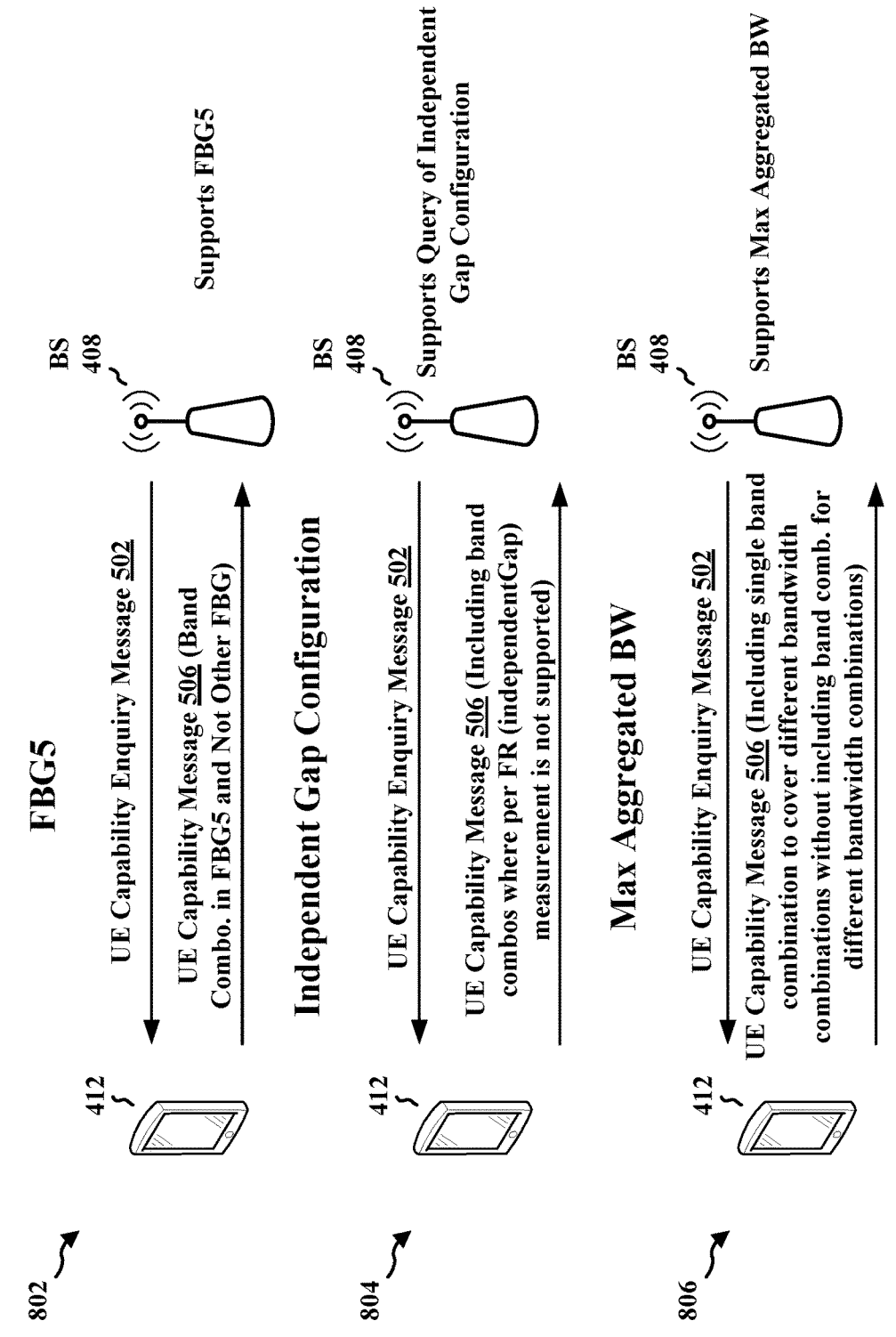
FIG. 8 is a diagram illustrating examples of UE capability enquiry messages being transmitted by a base station and UE capability messages being transmitted by a UE.

FIG. 8 is a diagram 800 illustrating examples of UE capability enquiry messages transmitted by a base station and UE capability messages transmitted by a UE. In a first example 802, the base station 408 (e.g., a gNB) may support FBG5 functionality (i.e., a feature). The base station 408 may transmit the UE capability enquiry message 502 (described above) to the UE 412. The UE 412 may transmit the UE capability message 506 (described above) to the base station 408 based on receiving the UE capability enquiry message 502. In an example, the UE 412 may support the FBG5 functionality. In an example, the UE capability message 506 may include an indication of frequency band combination(s) associated with FBG5 (without including an indication of frequency band combination(s) associated with other FBGs). In comparison to the UE capability information 414, the UE capability message 506 may be relatively smaller, may be associated with a reduced processing time at the UE 412 and/or the base station 408, and may take less memory storage space due to the indication of frequency band combination(s) associated with other FBGs not being included in the UE capability message 506.

In a second example 804, the base station 408 (e.g., a gNB) may support query for independent gap configuration functionality (i.e., a feature). The query for independent gap configuration functionality may be supported via RRC reconfiguration (i.e., "RRCReconfig") instead of reporting via UE capability information. If the UE 412 supports the query for independent gap configuration functionality, the UE capability message 506 may include band combinations where per-FR independent configuration is not supported. The base station 408 may transmit the UE capability enquiry message 502 (described above) to the UE 412. The UE 412 may transmit the UE capability message 506 (described above) to the base station 408 based on receiving the UE capability enquiry message 502. In an example, the UE 412 may support independent gap configuration functionality. The UE capability message 506 may include band combinations where per-FR independent gap configuration measurements are not supported. As a result, the base station 408 may be able to configure higher order CC band combinations based on the UE capability message 506. This may lead to higher spectrum utilization and higher performance (e.g., lower throughput) at the UE 412 in comparison to the second example 404.

In a third example 806, the base station 408 may support maximum aggregated bandwidth functionality (i.e., a feature). The base station 408 may transmit the UE capability enquiry message 502 (described above) to the UE 412. The UE 412 may transmit the UE capability message 506 (described above) to the base station 408 based on receiving the UE capability enquiry message 502. In an example, the UE 412 may support maximum aggregated bandwidth functionality. The UE capability message 506 may include a single band combination that may cover different bandwidth combinations without including band combinations for different bandwidth combinations. In comparison to the UE capability information 414, the UE capability message 506 may be relatively smaller, may be associated with a reduced processing time at the UE 412 and/or the base station 408, and may take less memory storage space due to the UE capability message 506 including a single band combination without including band combinations for different bandwidth combinations.

Figure 9:
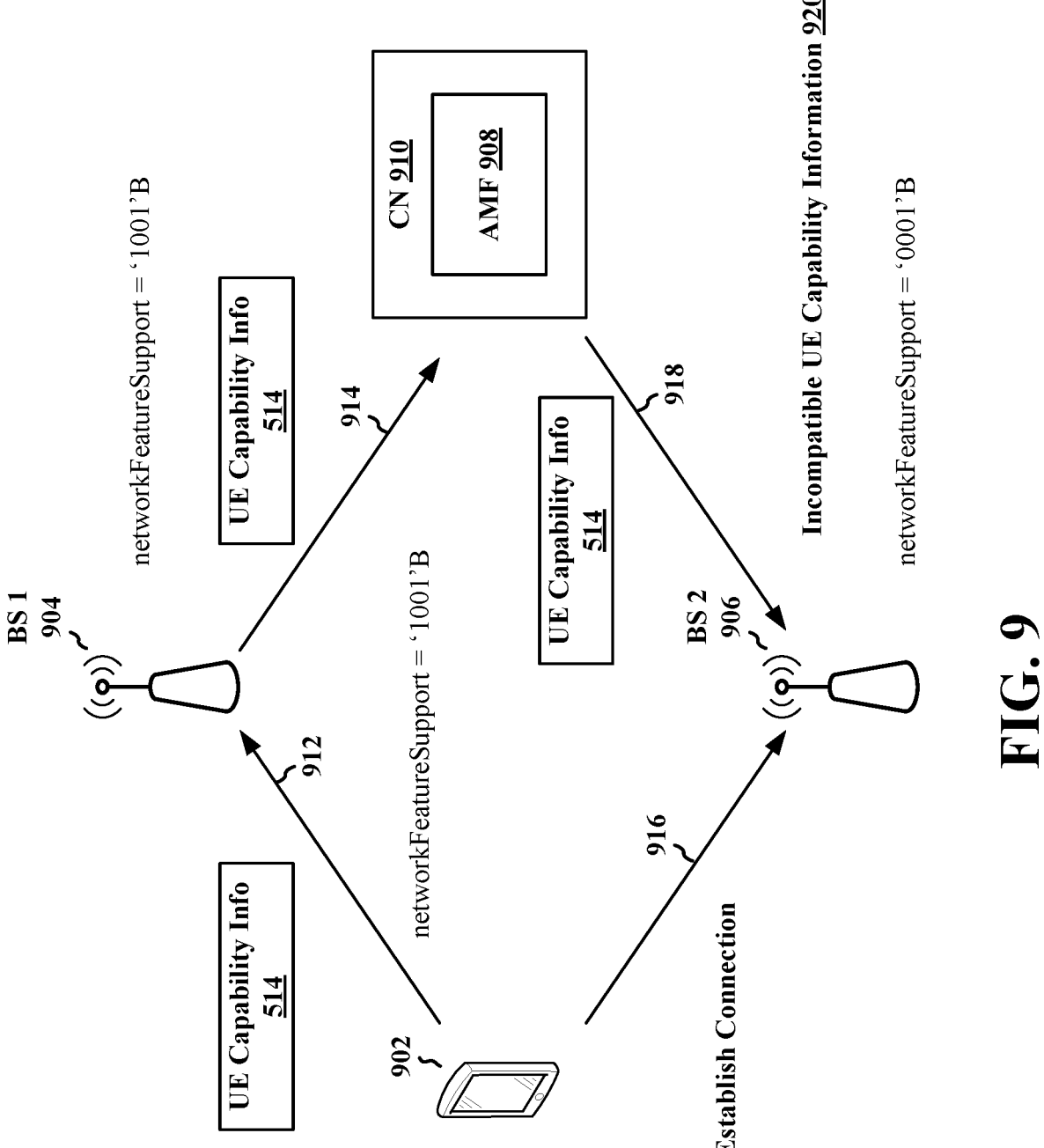
FIG. 9 is a diagram illustrating an example of communications exchanged between a UE, a first base station, a second base station, and an access and mobility management function (AMF) of a core network (CN).

FIG. 9 is a diagram 900 illustrating an example of communications exchanged between a UE 902, a first base station 904 (e.g., a first gNB), a second base station 906 (e.g., a second gNB), and an AMF 908 of a core network (CN) 910. The UE 902 may be the UE 104, the UE 350, the UE 412, or the UE 508. The first base station 904 or the second base station 906 may be the base station 102, the base station 310, the base station 408, or the base station 504. The AMF 908 may be the AMF 161 and the CN 910 may be the core network 120.

When the first base station 904 sends a UE capability enquiry (e.g., the UE capability enquiry message 502), the UE capability enquiry may include a bitmap (e.g., a "networkFeatureSupport" bitmap) that indicates features supported by the first base station 904. In an example, the bitmap may be the bitmap 704. In an example, the bitmap may include '1001'B to indicate that the first base station 904 supports a first feature and a fourth feature and that the first base station 904 does not support a second feature and a third feature. At 912, the UE 902 may transmit the UE capability information 514 (described above) based on the UE capability enquiry, where the UE capability information 514 may be based on the bitmap. In one aspect, the UE capability information 514 may also include the bitmap included in the UE capability enquiry. At 914, the first base station 904 may send the UE capability information 514 to the AMF 908 of the CN 910. The AMF 908 may store the UE capability information 514 (i.e., the UE capability information 514 may be stored at the AMF 908).

At 916, the UE 902 may establish a connection with the second base station 906. At 918, the second base station 906 may retrieve the UE capability information 514 from the AMF 908. At 920, the second base station 906 may compare the bitmap (e.g., '1001'B) included in the UE capability enquiry of the first base station 904 to a bitmap (e.g., a "networkFeatureSupport" bitmap) associated with features supported by the second base station 906. In an example, the bitmap associated with the second base station 906 may include '0001'B to indicate that the second base station 906 supports the first feature and that the second base station 906 does not support the second feature, the third feature, or the fourth feature. The second base station 906 may determine that a new UE capability enquiry is to be transmitted to the UE 902 in order to retrieve (new) UE capability information of the UE 902 that is compatible with features supported by the second base station 906.

Figure 10:
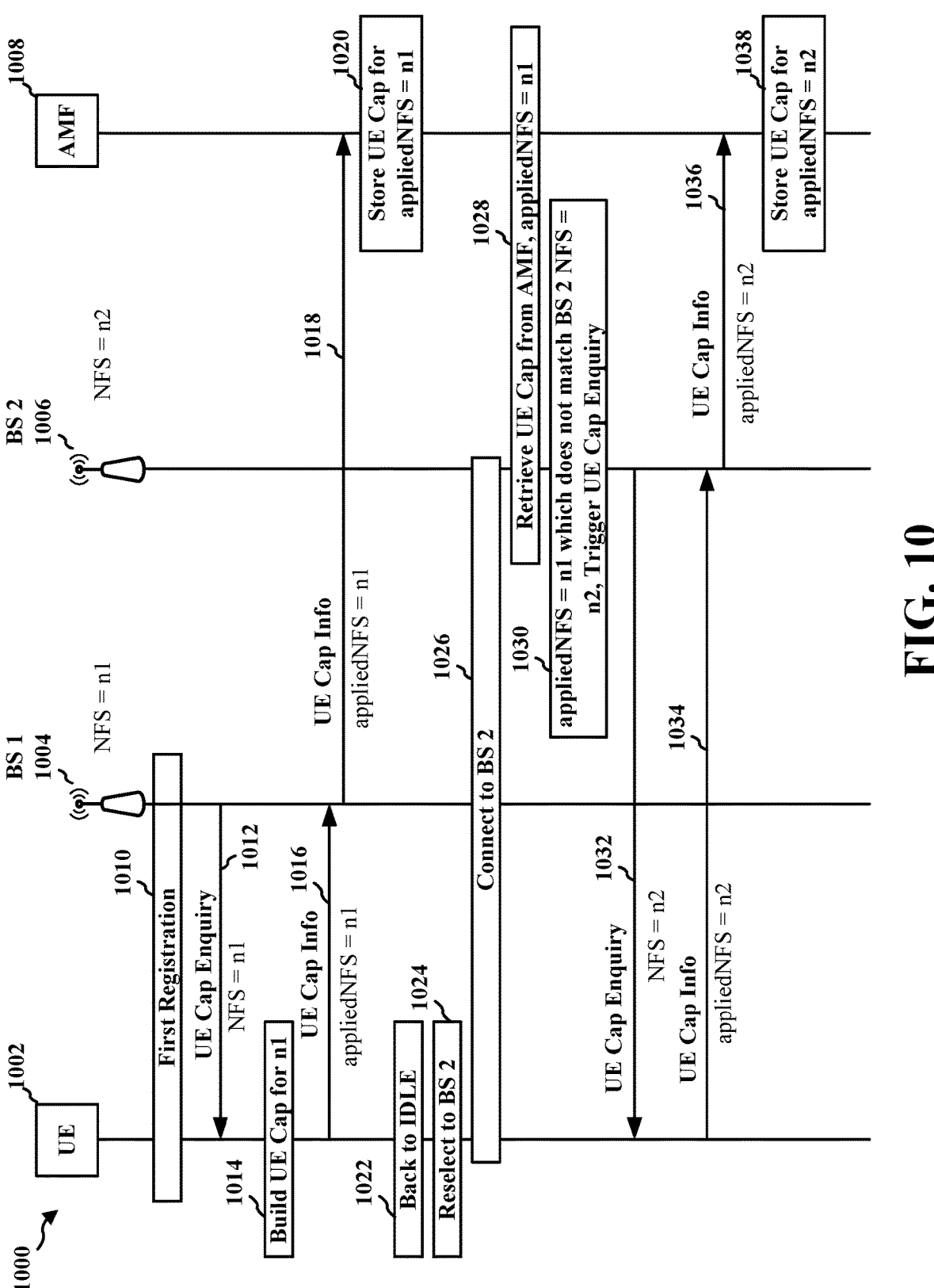
FIG. 10 is a diagram illustrating example communications exchanged between a UE, a first base station, a second base station, and an AMF.

FIG. 10 is a diagram 1000 illustrating example communications exchanged between a UE 1002, a first base station 1004, a second base station 1006, and an AMF 1008. The UE 1002 may be the UE 104, the UE 350, the UE 412, the UE 508, or the UE 902. The first base station 1004 may be the base station 102, the base station 310, the base station 408, the base station 504, or the first base station 904. The second base station 1006 may be the base station 102, the base station 310, the base station 408, the base station 504, or the second base station 906. The AMF 1008 may be the AMF 161 or the AMF 908. The AMF 1008 may be included in the core network 120 or the CN 910.

At 1010, the UE 1002 registers with the first base station 1004. At 1012, the first base station 1004 may transmit a UE capability enquiry (e.g., the UE capability enquiry message 502, the UE capability enquiry message 702) to the UE 1002. The UE capability enquiry may include a first network feature support (NFS) bitmap that includes bits indicating first features supported by the first base station 1004. In an example, the first NFS bitmap may be the bitmap 704. At 1014, the UE 1002 may build/construct UE capability information (e.g., the UE capability message 506) based on the UE capability enquiry. At 1016, the UE 1002 may transmit the UE capability information to the first base station 1004. The UE capability information may also include the first NFS bitmap. At 1018, the first base station 1004 may transmit the UE capability information to the AMF 1008. At 1020, the AMF 1008 may store the UE capability information (including the first NFS bitmap). At 1022, the UE 1002 may return to an idle state.

At 1024, the UE 1002 may select the second base station 1006. The second base station 1006 may support second features. At 1026, the UE 1002 may connect to the second base station 1006. At 1028, the second base station 1006 may retrieve the UE capability information from the AMF 1008. At 1030, the second base station 1006 may determine that the first NFS bitmap in the UE capability information does not match a second NFS bitmap of the second base station 1006 that includes bits indicating the second features supported by the second base station 1006.

At 1032, the second base station 1006 may transmit a UE capability enquiry (e.g., the UE capability enquiry message 502, the UE capability enquiry message 702) to the UE 1002. The UE capability enquiry may include the second NFS bitmap that includes bits indicating second features supported by the second base station 1006. At 1034, the UE 1002 may transmit UE capability information to the second base station 1006. The UE capability information transmitted at 1034 may be different from the UE capability information transmitted at 1016. The UE capability information may also include the second NFS bitmap. At 1036, the second base station 1006 may transmit the UE capability information to the AMF 1008. At 1038, the AMF may store the UE capability information (including the second NFS bitmap).

Figure 11:
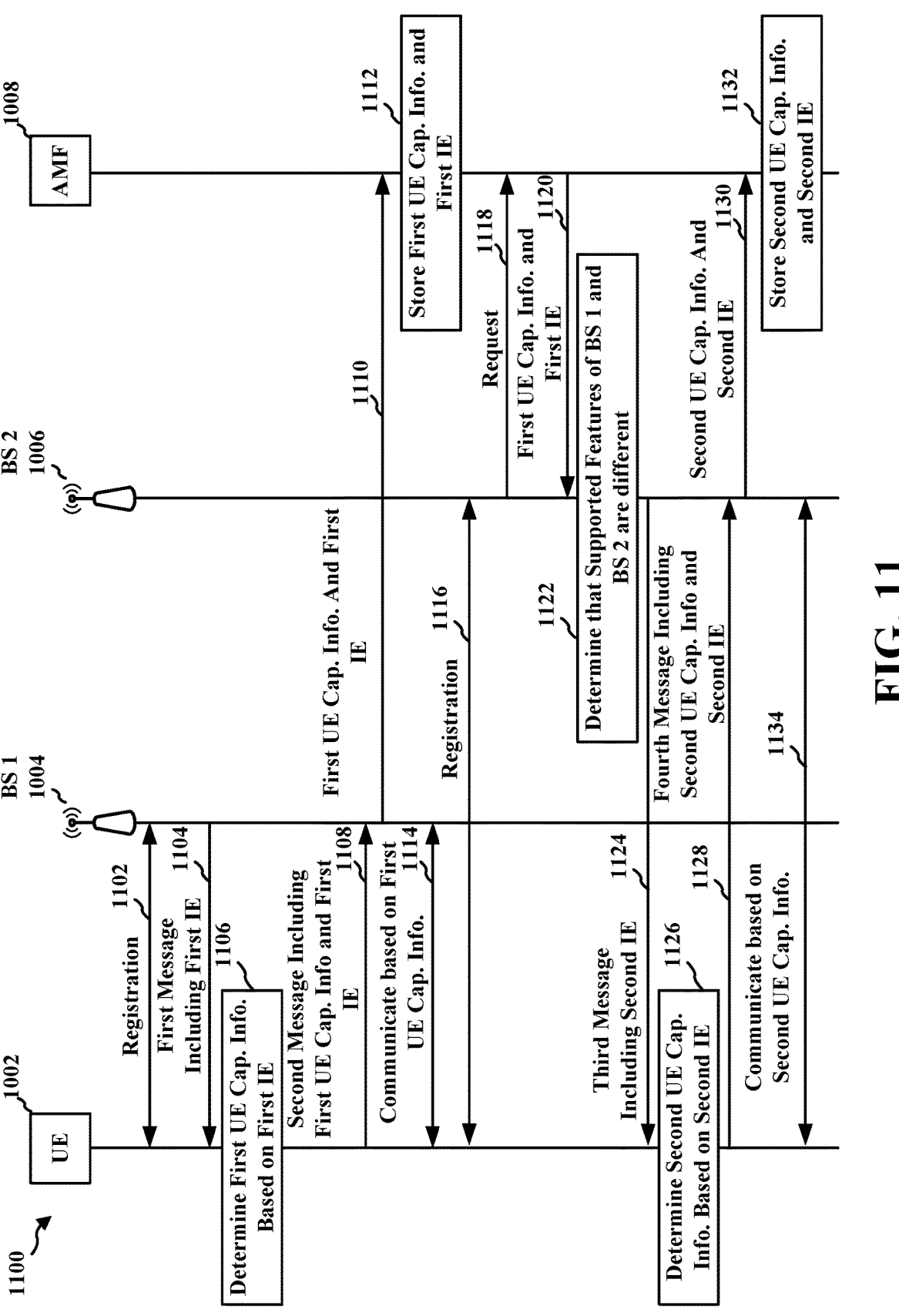
FIG. 11 is a diagram illustrating example communications exchanged between a UE, a first base station, a second base station, and an AMF.

FIG. 11 is a diagram 1100 illustrating example communications exchanged between the UE 1002, the first base station 904, the second base station 906, and the AMF 908. At 1102, the UE 1002 may register with the first base station 1004. At 1104, the first base station 1004 may transmit a first message (e.g., the UE capability enquiry message 502) that includes a first IE (e.g., the IE 510). At 1106, the UE 1002 may determine first UE capability information (e.g., the UE capability information 514) of the UE 1002 based on the first IE. At 1108, the UE 1002 may transmit a second message (e.g., the UE capability message 506) that includes the first UE capability information and the first IE. At 1110, the first base station 1004 may send the first UE capability information and the first IE to the AMF 1008. At 1112, the AMF 1008 may store the first UE capability information and the first IE. At 1114, the UE 1002 and the first base station 1004 may communicate based on the first UE capability information (e.g., using features indicated by the first UE capability information).

At 1116, the UE 1002 may register with the second base station 1006. At 1118, the second base station 1006 may send a request for information pertaining to the capabilities of the UE 1002 to the AMF 1008. At 1120, the AMF may send the first UE capability information and the first IE to the second base station 1006. At 1122, the second base station 1006 may determine that features supported by the second base station 1006 are different from features supported by the first base station 1004 (e.g., based on a comparison between the first IE and a second IE associated with features supported by the second base station 1006).

At 1124, the second base station 1006 may transmit a third message (e.g., a message similar to the UE capability enquiry message 502) that includes the second IE. At 1126, the UE 1002 may determine second UE capability information (e.g., information similar to the UE capability information 514) of the UE 1002 based on the second IE. At 1128, the UE 1002 may transmit a fourth message (e.g., a message similar to the UE capability message 506) that includes the second UE capability information and the second IE. At 1130, the second base station 1006 may send the second UE capability information and the second IE to the AMF 1008. At 1132, the AMF 1008 may store the second UE capability information and the second IE. At 1134, the UE 1002 and the first base station 1004 may communicate based on the second UE capability information (e.g., using features indicated by the second UE capability information).

FIG. 12 is a flowchart 1200 of a method of wireless communication. The method may be performed by a UE (e.g., the UE 104, the UE 350, the UE 412, the UE 508, the UE 902, the UE 1002, the apparatus 1804). The method may be associated with various advantages at the UE, such as smaller transmitted message sizes, reduced message processing times, higher throughput, higher spectrum utilization, and reduced amounts of memory storage for messages. In an example, the method may be performed by the feature support component 198.

At 1202, the UE receives a first message including a first IE that indicates a set of first features supported by a first network node. For example, FIG. 11 at 1104 shows that the UE 1002 may receive a first message that includes a first IE from a first base station 1004 (i.e., a first network node). In another example, FIG. 10 at 1012 shows that the UE 1002 may receive a UE capability enquiry, where the UE capability enquiry may include a NFS IE. In a further example, the first message may be the UE capability enquiry message 502, the IE may be the IE 510, and the first set of features may be the BS supported features 512. In yet another example, the first message may be the UE capability enquiry message 702. In an example, 1202 may be performed by the feature support component 198.

At 1204, the UE transmits, for the first network node, a second message including first UE capability information of the UE based on the first IE included in the first message, where the first UE capability information includes a subset of the set of first features supported by the first network node. For example, FIG. 11 at 1108 shows that the UE 1002 may transmit a second message that includes first UE capability information of the UE 1002 based on the first message received at 1104. In another example, FIG. 10 at 1016 shows that the UE 1002 may transmit UE capability information. In a further example, the second message may be the UE capability message 506, the first UE capability information may be the UE capability information 514, and the subset of the set of first features may be the UE supported features 516. In yet another example, FIG. 6 shows that the UE supported features in the UE capability message may be a subset of the BS supported features 512. In an example, 1204 may be performed by the feature support component 198.

Figure 13:
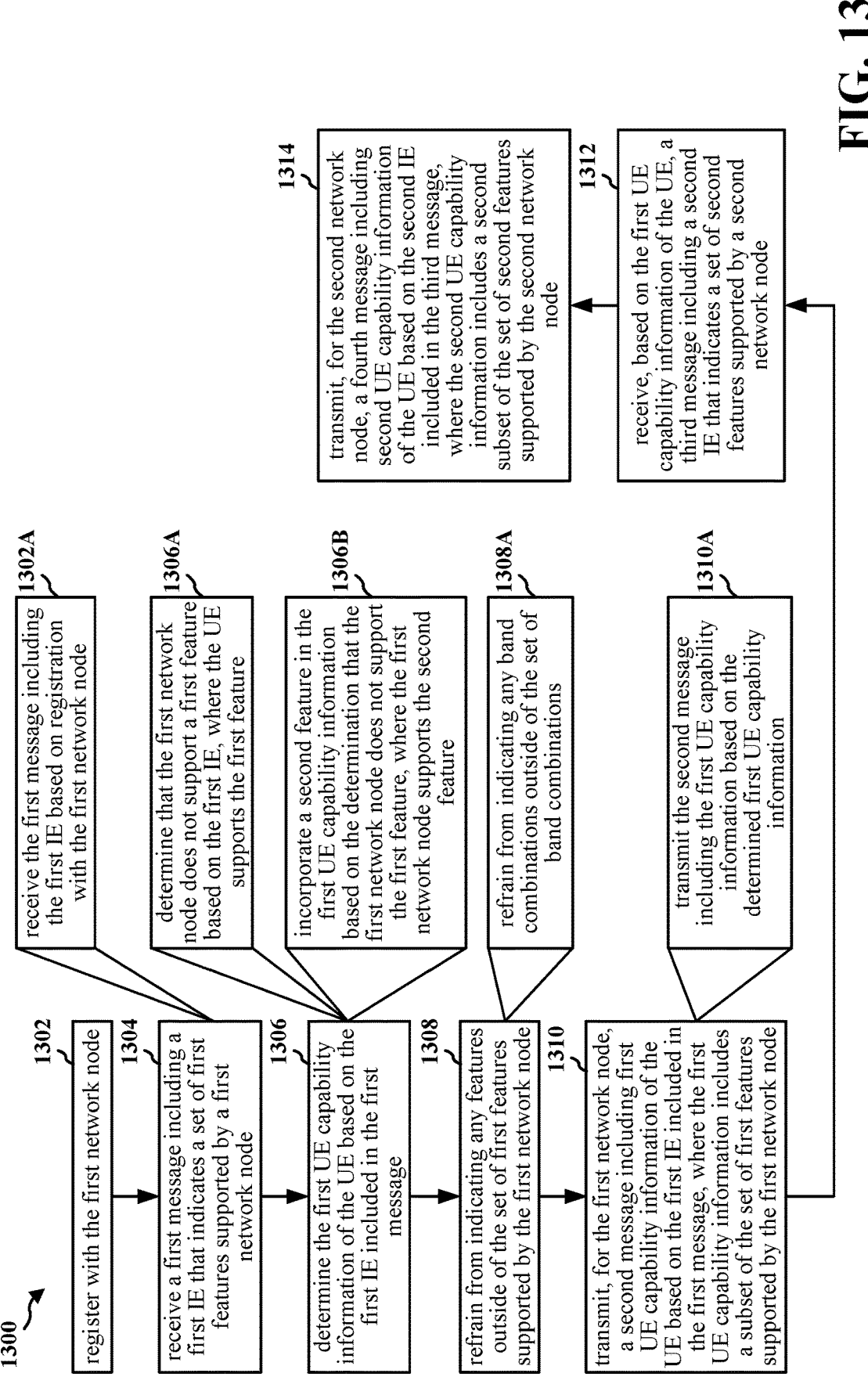
FIG. 13 is a flowchart of a method of wireless communication.

FIG. 13 is a flowchart 1300 of a method of wireless communication. The method may be performed by a UE (e.g., the UE 104, the UE 350, the UE 412, the UE 508, the UE 902, the UE 1002, the apparatus 1804). The method may be associated with various advantages at the UE, such as smaller transmitted message sizes, reduced message processing times, higher throughput, higher spectrum utilization, and reduced amounts of memory storage for messages. In an example, the method (including the various aspects detailed below) may be performed by the feature support component 198.

At 1304, the UE receives a first message including a first IE that indicates a set of first features supported by a first network node. For example, FIG. 11 at 1104 shows that the UE 1002 may receive a first message that includes a first IE from a first base station 1004 (i.e., a first network node). In another example, FIG. 10 at 1012 shows that the UE 1002 may receive a UE capability enquiry, where the UE capability enquiry may include a NFS IE. In a further example, the first message may be the UE capability enquiry message 502, the IE may be the IE 510, and the first set of features may be the BS supported features 512. In yet another example, the first message may be the UE capability enquiry message 702. In an example, 1304 may be performed by the feature support component 198.

At 1310, the UE transmits, for the first network node, a second message including first UE capability information of the UE based on the first IE included in the first message, where the first UE capability information includes a subset of the set of first features supported by the first network node. For example, FIG. 11 at 1108 shows that the UE 1002 may transmit a second message that includes first UE capability information of the UE 1002 based on the first message received at 1104. In another example, FIG. 10 at 1016 shows that the UE 1002 may transmit UE capability information. In a further example, the second message may be the UE capability message 506, the first UE capability information may be the UE capability information 514, and the subset of the set of first features may be the UE supported features 516. In yet another example, FIG. 6 shows that the UE supported features in the UE capability message may be a subset of the BS supported features 512. In an example, 1310 may be performed by the feature support component 198.

In one aspect, at 1308, the UE may refrain from indicating any features outside of the set of first features supported by the first network node. For example, the second example 604 of FIG. 6 shows that the UE may refrain from indicating features in the UE supported features 516 that are not supported by a base station (e.g., "F3"). In an example, 1308 may be performed by the feature support component 198.

In one aspect, at 1308A, the set of first features may include a set of band combinations and refraining from indicating any features outside of the set of first features may include refraining from indicating any band combinations outside of the set of band combinations. For example, in the second example 604 of FIG. 6, F1 and F2 may be or include a set of band combinations and F3 may be a band combination outside the set of band combinations. In an example, 1308A may be performed by the feature support component 198.

In one aspect, at 1306, the UE may determine the first UE capability information of the UE based on the first IE included in the first message. For example, FIG. 11 at 1106 shows that the UE 1002 may determine first UE capability information based on a first IE included in the first message received at 1104. In another example, FIG. 10 at 1014 shows that the UE 1002 may build UE capability information based on a UE capability enquiry received at 1012. In yet another example, FIG. 6 illustrates that the UE may determine first UE capability information of the UE based on a first IE included in a first message, where the first IE indicates the BS supported features 512. In an example, 1306 may be performed by the feature support component 198.

In one aspect, at 1310A, transmitting the second message including the first UE capability information may include transmitting the second message including the first UE capability information based on the determined first UE capability information. For example, the second message transmitted at 1108 may be transmitted based on the determination of the first UE capability information at 1106. In another example, the UE capability information transmitted at 1016 may be based on the UE capability information built at 1014. In an example, 1310A may be performed by the feature support component 198.

In one aspect, at 1306A, determining the first UE capability information of the UE based on the first IE may include determining that the first network node does not support a first feature based on the first IE, where the UE may support the first feature. For example, the fourth example 608 of FIG. 6 shows that a UE may determine that a base station does not support feature 2 and that the UE does support feature 2. In an example, 1306A may be performed by the feature support component 198.

In one aspect, at 1306B, determining the first UE capability information of the UE based on the first IE may include incorporating a second feature in the first UE capability information based on the determination that the first network node does not support the first feature, where the first network node may support the second feature. For example, the fourth example 608 of FIG. 6 shows that a UE may incorporate a substitute feature for feature 2 based on a determination that the base station does not support feature 2, where the base station supports the substitute feature for feature 2. In an example, 1306B may be performed by the feature support component 198.

In one aspect, the second message may further include the first IE. For example, FIG. 11 at 1108 shows that the second message transmitted at 1108 may include a first IE. In another example, FIG. 5 shows that the UE capability message 506 may include the IE 510 that was included in the UE capability enquiry message 502.

In one aspect, at 1312, the UE may receive, based on the first UE capability information of the UE, a third message including a second IE that indicates a set of second features supported by a second network node. For example, FIG. 11 at 1124 shows that the UE 1002 may receive a third message that includes a second IE that indicates features supported by the second base station 1006 (i.e., a second network node). In another example, FIG. 10 at 1032 shows that the UE 1002 may receive a UE capability enquiry that indicates features supported by the second base station 1006. In an example, 1312 may be performed by the feature support component 198.

In one aspect, at 1314, the UE may transmit, for the second network node, a fourth message including second UE capability information of the UE based on the second IE included in the third message, where the second UE capability information may include a second subset of the set of second features supported by the second network node. For example, FIG. 11 at 1128 shows that the UE 1002 may transmit a fourth message that includes second UE capability information of the UE 1002. In another example, FIG. 10 at 1034 shows that the UE 1002 may transmit UE capability information for the second base station 1006. In an example, 1314 may be performed by the feature support component 198.

In one aspect, the set of first features may include at least one of: a first indication of whether the first network node supports FBG functionality, a second indication of whether the first network node supports aggregated bandwidth functionality, or a third indication of whether the first network node supports a query for independent gap configuration. For example, FIG. 7 illustrates that features indicated in a UE capability enquiry message may include FBG5 support, aggregated bandwidth support, and independent gap configuration support. In another example, FIG. 8 illustrates that the UE capability enquiry message 502 may include an indication of whether a base station 408 supports FBG5 functionality, query for independent gap configuration functionality, and/or maximum aggregated bandwidth functionality.

In one aspect, the first IE may include a bitmap, where each bit in the bitmap may be indicative of whether the first network node supports a feature in the set of first features. For example, the IE 510 in the UE capability enquiry message 502 may be or include a bitmap. In another example, the bitmap may be the bitmap 704 depicted in FIG. 7. In yet another example, the table 706 shows that bits in the bitmap may be indicative of whether a first network node supports a feature in a set of first features.

In one aspect, at 1302, the UE may register with the first network node. For example, FIG. 11 at 1102 shows that the UE 1002 may register with the first base station 1004. In another example, FIG. 10 at 1010 shows that the UE 1002 and the first base station 1004 may undergo a first registration process. In an example, 1302 may be performed by the feature support component 198.

In one aspect, at 1302A, receiving the first message including the first IE may include receiving the first message including the first IE based on registration with the first network node. For example, the first message including the first IE received at 1104 may be based on the registration at 1102. In another example, the UE capability enquiry received at 1012 may be based on the first registration process at 1010. In an example, 1302A may be performed by the feature support component 198.

FIG. 14 is a flowchart 1400 of a method of wireless communication. The method may be performed by a network node (e.g., the base station 102, the base station 310, the base station 408, the base station 504, the first base station 904, the second base station 906, the first base station 1004, the second base station 1006, the network entity 1902). The method may be associated with various advantages at the network node, such as smaller transmitted message sizes, reduced message processing times, higher throughput, higher spectrum utilization, and reduced amounts of memory storage for messages. In an example, the method may be performed by the feature support component 199.

At 1402, the network node transmits a first message including a first IE that indicates a set of first features supported by the first network node. For example, FIG. 11 at 1104 shows that the first base station 1004 may transmit a first message that includes a first IE to a UE 1002. In another example, FIG. 10 at 1012 shows that the first base station 1004 may transmit a UE capability enquiry, where the UE capability enquiry may include a NFS IE. In a further example, the first message may be the UE capability enquiry message 502, the IE may be the IE 510, and the first set of features may be the BS supported features 512. In yet another example, the first message may be the UE capability enquiry message 702. In an example, 1402 may be performed by the feature support component 199.

At 1404, the network node receives, from a UE, a second message including first UE capability information of the UE based on the first IE included in the first message, where the first UE capability information includes a subset of the set of first features supported by the first network node. For example, FIG. 11 at 1108 shows that the first base station 1004 may receive a second message that includes first UE capability information of the UE 1002 based on the first message transmitted at 1104. In another example, FIG. 10 at 1016 shows that the first base station 1004 may receive UE capability information. In a further example, the second message may be the UE capability message 506, the first UE capability information may be the UE capability information 514, and the subset of the set of first features may be the UE supported features 516. In yet another example, FIG. 6 shows that the UE supported features in the UE capability message may be a subset of the BS supported features 512. In an example, 1404 may be performed by the feature support component 199.

FIG. 15 is a flowchart 1500 of a method of wireless communication. The method may be performed by a network node (e.g., the base station 102, the base station 310, the base station 408, the base station 504, the first base station 904, the second base station 906, the first base station 1004, the second base station 1006, the network entity 1902). The method may be associated with various advantages at the network node, such as smaller transmitted message sizes, reduced message processing times, higher throughput, higher spectrum utilization, and reduced amounts of memory storage for messages. In an example, the method (including the various aspects detailed below) may be performed by the feature support component 199.

At 1508, the network node transmits a first message including a first IE that indicates a set of first features supported by the first network node. For example, FIG. 11 at 1104 shows that the first base station 1004 may transmit a first message that includes a first IE to a UE 1002. In another example, FIG. 10 at 1012 shows that the first base station 1004 may transmit a UE capability enquiry, where the UE capability enquiry may include a NFS IE. In a further example, the first message may be the UE capability enquiry message 502, the IE may be the IE 510, and the first set of features may be the BS supported features 512. In yet another example, the first message may be the UE capability enquiry message 702. In an example, 1508 may be performed by the feature support component 199.

At 1510, the network node receives, from a UE, a second message including first UE capability information of the UE based on the first IE included in the first message, where the first UE capability information includes a subset of the set of first features supported by the first network node. For example, FIG. 11 at 1108 shows that the first base station 1004 may receive a second message that includes first UE capability information of the UE 1002 based on the first message transmitted at 1104. In another example, FIG. 10 at 1016 shows that the first base station 1004 may receive UE capability information. In a further example, the second message may be the UE capability message 506, the first UE capability information may be the UE capability information 514, and the subset of the set of first features may be the UE supported features 516. In yet another example, FIG. 6 shows that the UE supported features in the UE capability message may be a subset of the BS supported features 512. In an example, 1510 may be performed by the feature support component 199.

In one aspect, the subset of the set of first features may not include features outside of the set of first features supported by the first network node. In an example, the set of first features may be the BS supported features 512 and the subset of the set of first features may be the UE supported features 516. For instance, the second example 604 of FIG. 6 shows that the UE supported features 516 may not include features that are not supported by a base station.

In one aspect, the set of first features may include a set of band combinations, and the subset of the set of first features may not include band combinations outside of the set of band combinations. For example, in the second example 604 of FIG. 6, F1 and F2 may be or include a set of band combinations and F3 may be a band combination outside the set of band combinations.

In one aspect, at 1512, the network node may transmit, for at least one network entity or a CN, the first IE and the first UE capability information of the UE. For example, FIG. 11 at 1110 shows that the first base station 1004 may transmit first UE capability information for the UE 1002 and a first IE to the AMF 1008. In another example, FIG. 9 at 914 shows that the first base station 904 may transmit the UE capability information 514 to the AMF 908 of the CN 910. In an example, 1512 may be performed by the feature support component 199.

In one aspect, the second message may further include the first IE. For example, FIG. 11 at 1108 shows that the second message received at 1108 may include a first IE. In another example, FIG. 5 shows that the UE capability message 506 may include the IE 510 that was included in the UE capability enquiry message 502.

In one aspect, at 1504, the network node may receive, from a CN, a second IE that indicates a set of second features supported by a second network node. For example, FIG. 11 at 1120 shows that the second base station 1006 may receive a first IE that indicates features supported by the first base station 1004 from the AMF 1008. In another example, FIG. 10 at 1028 shows that the second base station 1006 may retrieve UE capability information from the AMF 1008. In an example, 1504 may be performed by the feature support component 199.

In one aspect, at 1506, the network node may determine that the set of first features supported by the first network node and the set of second features supported by the second network node are not equivalent, where the first message may be transmitted based on the determination. For example, FIG. 11 at 1122 shows that the second base station 1006 may determine that features supported by the first base station 1004 and features supported by the second base station 1006 are different. In a further example, FIG. 10 at 1030 shows that the second base station 1006 may determine that features supported by the first base station 1004 are not equivalent to features supported by the second base station 1006. In another example, FIG. 9 at 920 shows that the second base station 906 may determine that features supported by the first base station 904 are not equivalent to features supported by the second base station 906. In an example, 1506 may be performed by the feature support component 199.

In one aspect, the second IE may be received from an AMF of the CN. In an example, the AMF may be the AMF 908 and the CN may be the CN 910. In another example, the AMF may be the AMF 161 and the core network may be the core network 120. In a further example, the AMF may be the AMF 1008.

In one aspect, the set of first features may include at least one of: a first indication of whether the first network node supports FBG functionality, a second indication of whether the first network node supports aggregated bandwidth functionality, or a third indication of whether the first network node supports a query for independent gap configuration. For example, FIG. 7 illustrates that features indicated in a UE capability enquiry message may include FBG5 support, aggregated bandwidth support, and independent gap configuration support. In another example, FIG. 8 illustrates that the UE capability enquiry message 502 may include an indication of whether a base station 408 supports FBG5 functionality, query for independent gap configuration functionality, and/or maximum aggregated bandwidth functionality.

In one aspect, the first IE may include a bitmap, where each bit in the bitmap may be indicative of whether the first network node supports a feature in the set of first features. For example, the IE 510 in the UE capability enquiry message 502 may be or included a bitmap. In another example, the bitmap may be the bitmap 704 depicted in FIG. 7. In yet another example, the table 706 shows that bits in the bitmap may be indicative of whether a first network node supports a feature in a set of first features.

In one aspect, at 1502, the network node may register the UE. For example, FIG. 11 at 1102 shows that the first base station 1004 may register the UE 1002. In another example, FIG. 10 at 1010 shows that the UE 1002 and the first base station 1004 may undergo a first registration process. In an example, 1502 may be performed by the feature support component 199.

In one aspect, at 1508A, transmitting the first message including the first IE may include transmitting the first message including the first IE based on registration of the UE. For example, the first message including the first IE transmitted at 1104 may be based on the registration at 1102. In another example, the UE capability enquiry transmitted at 1012 may be based on the first registration process at 1010. In an example, 1508A may be performed by the feature support component 199.

FIG. 16 is a flowchart 1600 of a method of wireless communication. The method may be performed by a network entity (e.g., the core network 120, the CN 910, the AMF 1008, the network entity 2060). The method may be associated with various advantages at the network entity, such as efficient facilitation of communications between a UE and a network node. In an example, the method may be performed by the feature support component 2016.

At 1602, the network entity obtains, from a first network node, a first IE that indicates a set of first features supported by the first network node and first UE capability information of a UE, where the first UE capability information includes a subset of the set of first features supported by the first network node. For example, FIG. 11 at 1110 shows that the AMF 1008 may receive a first IE and first UE capability information of the UE 1002 from the first base station 1004. In another example, FIG. 10 at 1018 shows that the AMF 1008 may receive UE capability information for the UE 1002 from the first base station 1004. In yet another example, FIG. 9 at 914 shows that the AMF 908 of the CN 910 may receive UE capability information 514 of the UE 902. In an example, the first IE may be the IE 510 and the first UE capability information may be the UE capability information 514. In a further example, FIG. 6 illustrates that first UE capability information may include a set of first features supported by a first network node. In an example, 1602 may be performed by the feature support component 2016.

At 1604, the network entity transmits, for a second network node, the first IE and the first UE capability information in response to a reception of a request from the second network node, where the second network node supports a set of second features. For example, FIG. 11 at 1120 shows that the AMF 1008 may transmit a first IE and first UE capability information to a second base station 1006 in response to receiving a request at 1118. In another example, FIG. 9 at 918 shows that the AMF 908 of the CN 910 may transmit the UE capability information 514 to the second base station 906. In yet another example, the first base station 904 may be associated with "networkFeatureSupport='1001'B" and the second base station 906 may be associated with "networkFeatureSupport='0001'B." In an example, 1604 may be performed by the feature support component 2016.

Figure 17:
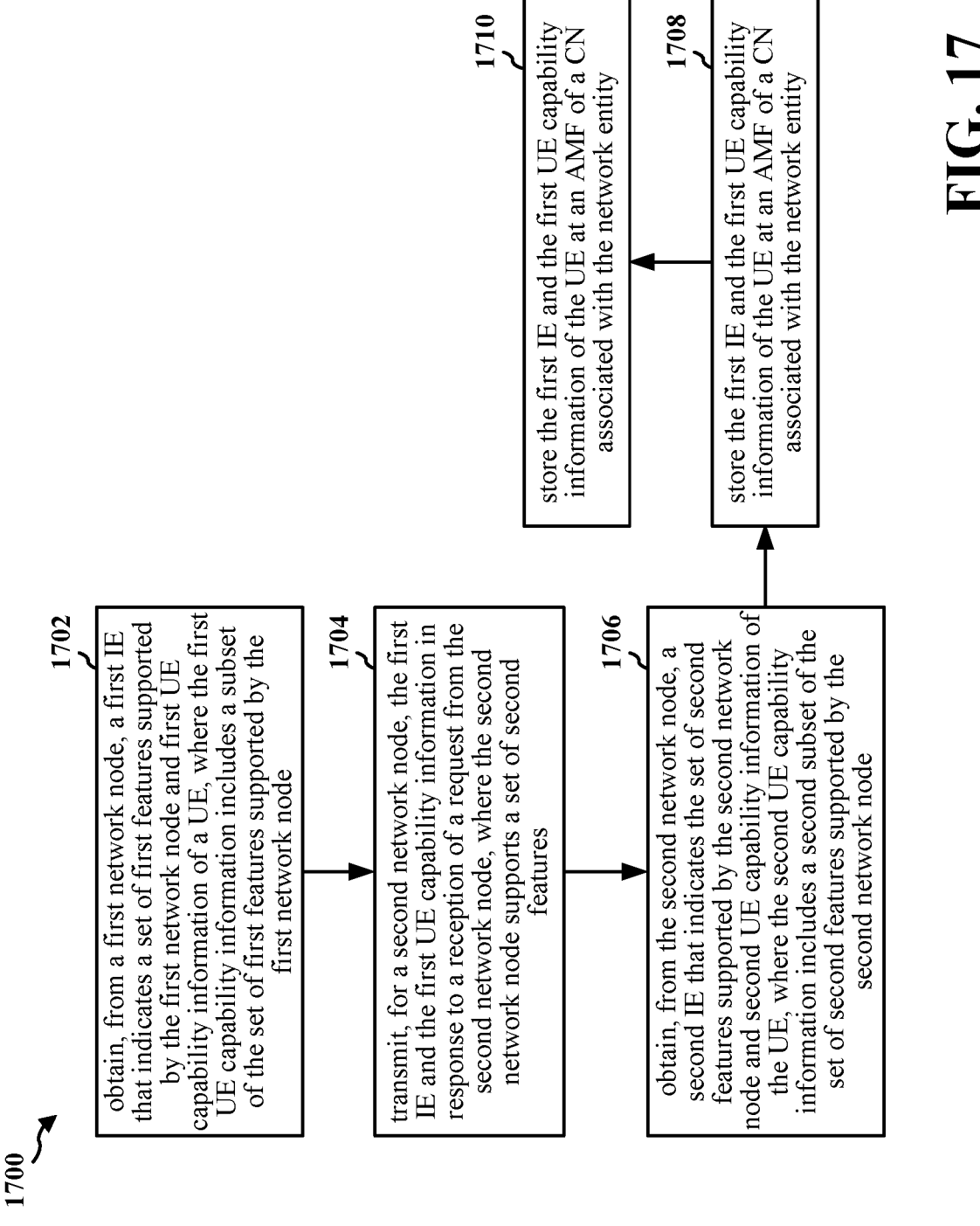
FIG. 17 is a flowchart of a method of wireless communication.

FIG. 17 is a flowchart 1700 of a method of wireless communication. The method may be performed by a network entity (e.g., the core network 120, the CN 910, the AMF 1008, the network entity 2060). The method may be associated with various advantages at the network entity, such as efficient facilitation of communications between a UE and a network node. In an example, the method (including the various aspects detailed below) may be performed by the feature support component 2016.

At 1702, the network entity obtains, from a first network node, a first IE that indicates a set of first features supported by the first network node and first UE capability information of a UE, where the first UE capability information includes a subset of the set of first features supported by the first network node. For example, FIG. 11 at 1110 shows that the AMF 1008 may receive a first IE and first UE capability information of the UE 1002 from the first base station 1004. In another example, FIG. 10 at 1018 shows that the AMF 1008 may receive UE capability information for the UE 1002 from the first base station 1004. In yet another example, FIG. 9 at 914 shows that the AMF 908 of the CN 910 may receive UE capability information 514 of the UE 902. In an example, the first IE may be the IE 510 and the first UE capability information may be the UE capability information 514. In a further example, FIG. 6 illustrates that first UE capability information may include a set of first features supported by a first network node. In an example, 1702 may be performed by the feature support component 2016.

At 1704, the network entity transmits, for a second network node, the first IE and the first UE capability information in response to a reception of a request from the second network node, where the second network node supports a set of second features. For example, FIG. 11 at 1120 shows that the AMF 1008 may transmit a first IE and first UE capability information to a second base station 1006 in response to receiving a request at 1118. In another example, FIG. 9 at 918 shows that the AMF 908 of the CN 910 may transmit the UE capability information 514 to the second base station 906. In yet another example, the first base station 904 may be associated with "networkFeatureSupport='1001'B" and the second base station 906 may be associated with "networkFeatureSupport='0001'B." In an example, 1704 may be performed by the feature support component 2016.

In one aspect, at 1706, the network entity may obtain, from the second network node, a second IE that indicates the set of second features supported by the second network node and second UE capability information of the UE, where the second UE capability information may include a second subset of the set of second features supported by the second network node. For example, FIG. 11 at 1130 shows that the AMF 1008 may obtain second UE capability information for the UE 1002 and a second IE that indicates features supported by the second base station 1006. In another example, FIG. 10 at 1036 shows that the AMF 1008 may receive UE capability information for the UE 1002. In an example, 1706 may be performed by the feature support component 2016.

In one aspect, at 1708, the network entity may store the first IE and the first UE capability information of the UE at an AMF of a CN associated with the network entity. For example, FIG. 11 at 1112 shows that the AMF 1008 may store first UE capability information and a first IE. In another example, FIG. 10 at 1020 shows that the AMF 1008 may store UE capability information for "appliedNFS=n1," that is, the AMF 1008 may store a first IE and first UE capability information of the UE 1002. In an example, 1708 may be performed by the feature support component 2016.

In one aspect, at 1710, the network entity may store the second IE and the second UE capability information of the UE at the AMF of the CN associated with the network entity. For example, FIG. 11 at 1132 shows that the AMF 1008 may store second UE capability information and a second IE. In another example, FIG. 10 at 1038 shows that the AMF 1008 may store UE capability information for "appliedNFS=n2," that is, the AMF 1008 may store a second IE and second UE capability information of the UE 1002. In an example, 1710 may be performed by the feature support component 2016.

In one aspect, the set of first features may be equivalent to the set of second features. For example, features indicated by the first IE stored at 1112 may be equivalent to features indicated by the second IE stored at 1132.

In one aspect, the set of first features and the set of second features may differ by at least one feature. For example, features indicated by the first IE stored at 1112 may differ from features indicated by the second IE stored at 1132.

In one aspect, the set of first features may include at least one of: a first indication of whether the first network node supports FBG functionality, a second indication of whether the first network node supports aggregated bandwidth functionality, or a third indication of whether the first network node supports a query for independent gap configuration. For example, FIG. 7 illustrates that features indicated in a UE capability enquiry message may include FBG5 support, aggregated bandwidth support, and independent gap configuration support. In another example, FIG. 8 illustrates that the UE capability enquiry message 502 may include an indication of whether a base station 408 supports FBG5 functionality, query for independent gap configuration functionality, and/or maximum aggregated bandwidth functionality.

In one aspect, the first IE may include a bitmap, where each bit in the bitmap may be indicative of whether the first network node supports a feature in the set of first features. For example, the IE 510 in the UE capability enquiry message 502 may be or include a bitmap. In another example, the bitmap may be the bitmap 704 depicted in FIG. 7. In yet another example, the table 706 shows that bits in the bitmap may be indicative of whether a first network node supports a feature in a set of first features.

In one aspect, the subset of the set of first features may not include features outside of the set of first features supported by the first network node. In an example, the set of first features may be the BS supported features 512 and the subset of the set of first features may be the UE supported features 516. For instance, the second example 604 of FIG. 6 shows that the UE supported features 516 may not include features that are not supported by a base station.

In one aspect, the set of first features may include a set of band combinations, and the subset of the set of first features may not include band combinations outside of the set of band combinations. For example, in the second example 604 of FIG. 6, F1 and F2 may be or include a set of band combinations and F3 may be a band combination outside the set of band combinations.

Figure 18:
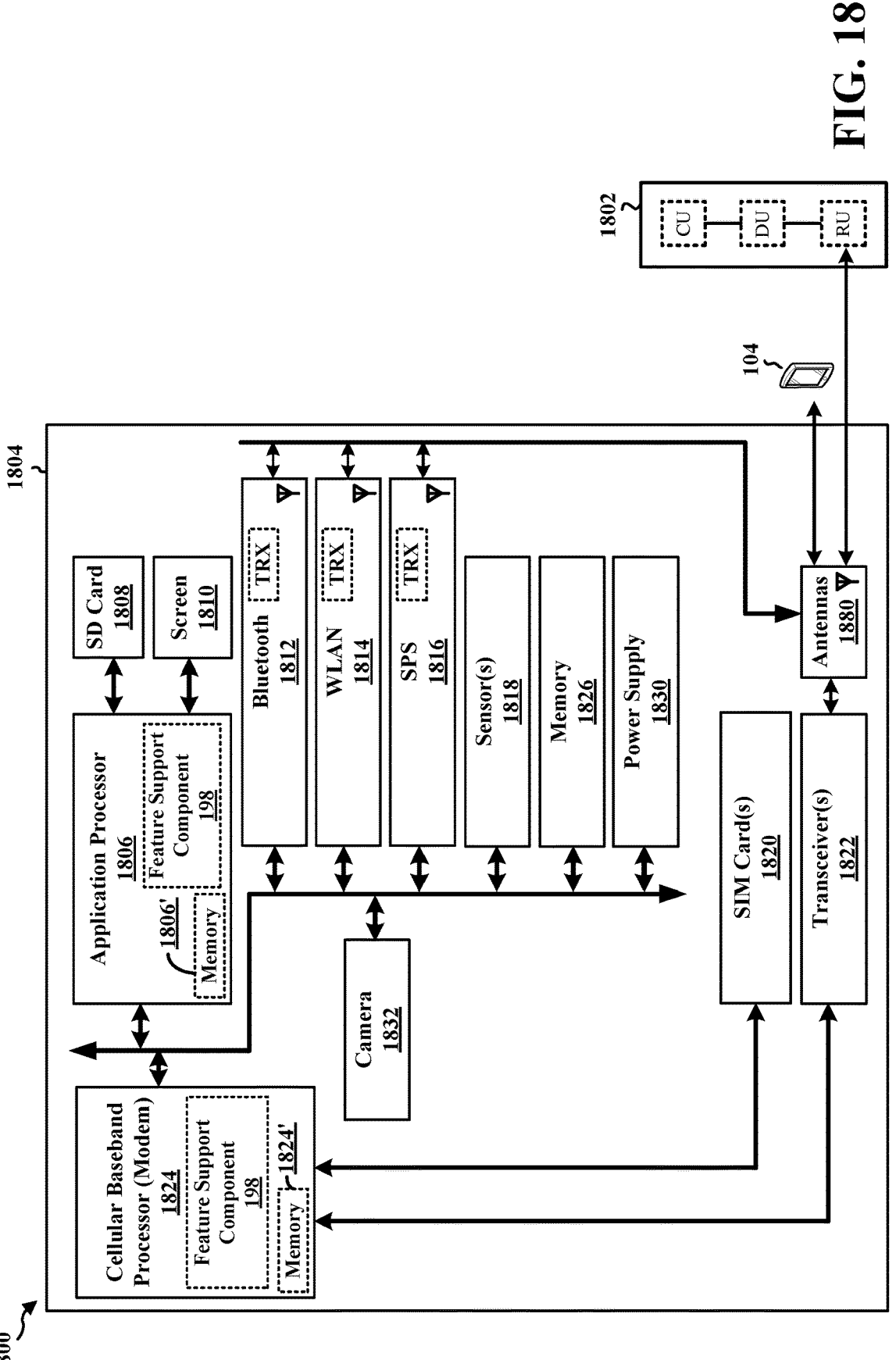
FIG. 18 is a diagram illustrating an example of a hardware implementation for an example apparatus.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see 350 of FIG. 3) and include the additional modules of the apparatus 1804.

As discussed supra, the feature support component 198 is configured to receive a first message including a first IE that indicates a set of first features supported by a first network node. The feature support component 198 is configured to transmit, for the first network node, a second message including first UE capability information of the UE based on the first IE included in the first message, where the first UE capability information includes a subset of the set of first features supported by the first network node. The feature support component 198 is configured to refrain from indicating any features outside of the set of first features supported by the first network node. The feature support component 198 is configured to refrain from indicating any band combinations outside of the set of band combinations. The feature support component 198 is configured to determine the first UE capability information of the UE based on the first IE included in the first message. The feature support component 198 is configured to transmit the second message including the first UE capability information based on the determined first UE capability information. The feature support component 198 is configured to determine that the first network node does not support a first feature based on the first IE, where the UE supports the first feature. The feature support component 198 is configured to incorporate a second feature in the first UE capability information based on the determination that the first network node does not support the first feature, where the first network node supports the second feature. The feature support component 198 is configured to receive, based on the first UE capability information of the UE, a third message including a second IE that indicates a set of second features supported by a second network node. The feature support component 198 is configured to transmit, for the second network node, a fourth message including second UE capability information of the UE based on the second IE included in the third message, where the second UE capability information includes a second subset of the set of second features supported by the second network node. The feature support component 198 is configured to register with the first network node. The feature support component 198 is configured to receive the first message including the first IE based on registration with the first network node. The feature support component 198 may be within the cellular baseband processor 1824, the application processor 1806, or both the cellular baseband processor 1824 and the application processor 1806. The feature support component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, includes means for receiving a first message including a first IE that indicates a set of first features supported by a first network node. In one configuration, the apparatus 1804, and in particular the cellular baseband processor 1824 and/or the application processor 1806, includes means for transmitting, for the first network node, a second message including first UE capability information of the UE based on the first IE included in the first message, where the first UE capability information includes a subset of the set of first features supported by the first network node. In one configuration, the apparatus 1804, and in particular the cellular baseband processor 1824 and/or the application processor 1806, includes means for refraining from indicating any features outside of the set of first features supported by the first network node. In one configuration where the set of first features includes a set of band combinations, the means for refraining from indicating any features outside of the set of first features supported by the first network node include means for refraining from indicating any band combinations outside of the set of band combinations. In one configuration, the apparatus 1804, and in particular the cellular baseband processor 1824 and/or the application processor 1806, includes means for determining the first UE capability information of the UE based on the first IE included in the first message. In one configuration, the apparatus 1804, and in particular the cellular baseband processor 1824 and/or the application processor 1806, includes means for transmitting the second message including the first UE capability information based on the determined first UE capability information. In one configuration, the means for determining the first UE capability information of the UE based on the first IE includes means for determining that the first network node does not support a first feature based on the first IE, where the UE supports the first feature. In one configuration, the means for determining the first UE capability information of the UE based on the first IE includes incorporating a second feature in the first UE capability information based on determining that the first network node does not support the first feature, where the first network node supports the second feature. In one configuration, the apparatus 1804, and in particular the cellular baseband processor 1824 and/or the application processor 1806, includes means for receiving, based on the first UE capability information of the UE, a third message including a second IE that indicates a set of second features supported by a second network node. In one configuration, the apparatus 1804, and in particular the cellular baseband processor 1824 and/or the application processor 1806, includes means for transmitting, for the second network node, a fourth message including second UE capability information of the UE based on the second IE included in the third message, where the second UE capability information includes a second subset of the set of second features supported by the second network node. In one configuration, the apparatus 1804, and in particular the cellular baseband processor 1824 and/or the application processor 1806, includes means for registering with the first network node. In one configuration, the apparatus 1804, and in particular the cellular baseband processor 1824 and/or the application processor 1806, includes means for receiving the first message including the first IE based on registering with the first network node. The means may be the feature support component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
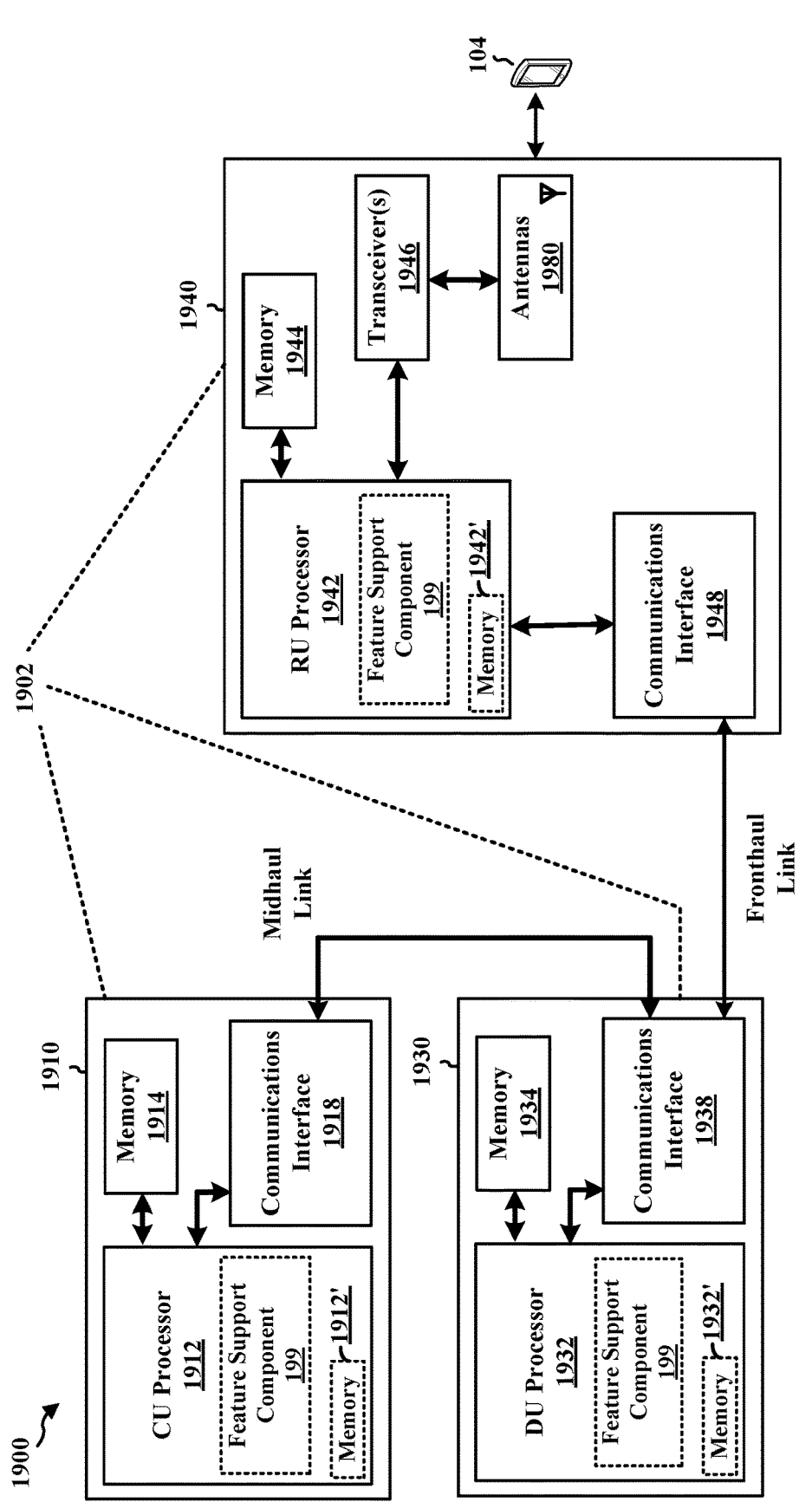
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the feature support component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the feature support component 199 is configured to transmit a first message including a first IE that indicates a set of first features supported by the first network node. The feature support component 199 is configured to receive, from a UE, a second message including first UE capability information of the UE based on the first IE included in the first message, where the first UE capability information includes a subset of the set of first features supported by the first network node. The feature support component 199 is configured to transmit, for at least one network entity or a CN, the first IE and the first UE capability information of the UE. The feature support component 199 is configured to receive, from a CN, a second IE that indicates a set of second features supported by a second network node. The feature support component 199 is configured to determine that the set of first features supported by the first network node and the set of second features supported by the second network node are not equivalent, where the first message is transmitted based on the determination. The feature support component 199 is configured to register the UE. The feature support component 199 is configured to transmit the first message including the first IE based on registration of the UE. The feature support component 199 may be within one or more processors of one or more of the CU 1910, DU 1930, and the RU 1940. The feature support component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 includes means for transmitting a first message including a first IE that indicates a set of first features supported by the first network node. In one configuration, the network entity 1902 includes means for receiving, from a UE, a second message including first UE capability information of the UE based on the first IE included in the first message, where the first UE capability information includes a subset of the set of first features supported by the first network node. In one configuration, the network entity 1902 includes means for transmitting, for at least one network entity or a CN, the first IE and the first UE capability information of the UE. In one configuration, the network entity 1902 includes means for receiving, from a CN, a second IE that indicates a set of second features supported by a second network node. In one configuration, the network entity 1902 includes means for determining that the set of first features supported by the first network node and the set of second features supported by the second network node are not equivalent, where the first message is transmitted based on the determination. In one configuration, the network entity 1902 includes means for registering the UE. In one configuration, the network entity 1902 includes means for transmitting the first message including the first IE based on registering the UE. The means may be the feature support component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
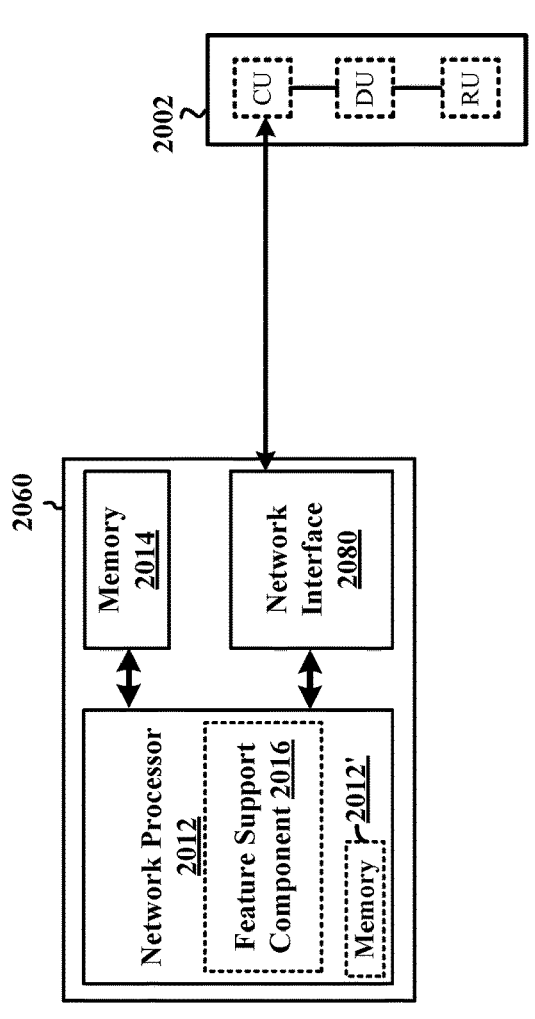
FIG. 20 is a diagram illustrating an example of a hardware implementation for an example network entity.

FIG. 20 is a diagram 2000 illustrating an example of a hardware implementation for a network entity 2060. In one example, the network entity 2060 may be within the core network 120. The network entity 2060 may include a network processor 2012. The network processor 2012 may include on-chip memory 2012'. In some aspects, the network entity 2060 may further include additional memory modules 2014. The network entity 2060 communicates via the network interface 2080 directly (e.g., backhaul link) or indirectly (e.g., through a RIC) with the CU 2002. The on-chip memory 2012' and the additional memory modules 2014 may each be considered a computer-readable medium/memory. Each computer-readable medium/memory may be non-transitory. The processor 2012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the feature support component 2016 is configured to obtain, from a first network node, a first IE that indicates a set of first features supported by the first network node and first UE capability information of a UE, where the first UE capability information includes a subset of the set of first features supported by the first network node. The feature support component 2016 is configured to transmit, for a second network node, the first IE and the first UE capability information in response to a reception of a request from the second network node, where the second network node supports a set of second features. The feature support component 2016 is configured to obtain, from the second network node, a second IE that indicates the set of second features supported by the second network node and second UE capability information of the UE, where the second UE capability information includes a second subset of the set of second features supported by the second network node. The feature support component 2016 is configured to store the first IE and the first UE capability information of the UE at an AMF of a CN associated with the network entity. The feature support component 2016 is configured to store the second IE and the second UE capability information of the UE at the AMF of the CN associated with the network entity. The feature support component 2016 may be within the processor 2012. The feature support component 2016 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2060 may include a variety of components configured for various functions. In one configuration, the network entity 2060 includes means for obtaining, from a first network node, a first IE that indicates a set of first features supported by the first network node and first UE capability information of a UE, where the first UE capability information includes a subset of the set of first features supported by the first network node. In one configuration, the network entity 2060 includes means for transmitting, for a second network node, the first IE and the first UE capability information in response to receiving a request from the second network node, where the second network node supports a set of second features. In one configuration, the network entity 2060 includes means for obtaining, from the second network node, a second IE that indicates the set of second features supported by the second network node and second UE capability information of the UE, where the second UE capability information includes a second subset of the set of second features supported by the second network node. In one configuration, the network entity 2060 includes means for storing the first IE and the first UE capability information of the UE at an AMF of a CN associated with the network entity. In one configuration, the network entity 2060 includes means for storing the second IE and the second UE capability information of the UE at the AMF of the CN associated with the network entity. The means may be the feature support component 2016 of the network entity 2060 configured to perform the functions recited by the means.

As noted above, a base station and a UE may be configured with a first set of features and a second set of features, respectively, that facilitate wireless communications between the base station and the UE. The first set of features and the second set of features may vary. The base station may transmit a UE capability enquiry to the UE that may include an indication of the first set of features. The UE may transmit UE capability information to the base station that may indicate the second set of features supported by the UE. In an example, the UE capability information may include an indication of whether or not each feature in the first set of features and/or the second set of features is supported by the UE. This may lead to a message size of the UE capability information becoming relatively large. Processing the UE capability information may be time consuming due to the large message size. Furthermore, storing the UE capability information may be burdensome due to the relatively large message size.

Various technologies pertaining to steering UE capability information based on network capability features are described herein. In an example, a UE receives a first message including a first IE that indicates a set of first features supported by a first network node. The UE transmits, for the first network node, a second message including first UE capability information of the UE based on the first IE included in the first message, where the first UE capability information includes a subset of the set of first features supported by the first network node. Vis-à-vis selectively advertising the second set of features based on the first IE (e.g., not advertising features of the UE that are not supported by the first network node), a size of the second message may be reduced. Thus, the above-described technologies may be associated with reduced storage characteristics and reduced processing times at both the UE and the first network node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a first message including a first IE that indicates a set of first features supported by a first network node; and transmitting, for the first network node, a second message including first UE capability information of the UE based on the first IE included in the first message, where the first UE capability information includes a subset of the set of first features supported by the first network node.

Aspect 2 is the method of aspect 1, further including: refraining from indicating any features outside of the set of first features supported by the first network node.

Aspect 3 is the method of aspect 2, where the set of first features includes a set of band combinations, and where refraining from indicating any features outside of the set of first features includes: refraining from indicating any band combinations outside of the set of band combinations.

Aspect 4 is the method of any of aspects 1-3, further including: determining the first UE capability information of the UE based on the first IE included in the first message, where transmitting the second message including the first UE capability information includes: transmitting the second message including the first UE capability information based on the determined first UE capability information.

Aspect 5 is the method of aspect 4, where determining the first UE capability information of the UE based on the first IE includes: determining that the first network node does not support a first feature based on the first IE, where the UE supports the first feature; and incorporating a second feature in the first UE capability information based on determining that the first network node does not support the first feature, where the first network node supports the second feature.

Aspect 6 is the method of any of aspects 1-5, where the second message further includes the first IE.

Aspect 7 is the method of any of aspects 1-6, further including: receiving, based on the first UE capability information of the UE, a third message including a second IE that indicates a set of second features supported by a second network node; and transmitting, for the second network node, a fourth message including second UE capability information of the UE based on the second IE included in the third message, where the second UE capability information includes a second subset of the set of second features supported by the second network node.

Aspect 8 is the method of any of aspects 1-7, where the set of first features includes at least one of: a first indication of whether the first network node supports FBG functionality, a second indication of whether the first network node supports aggregated bandwidth functionality, or a third indication of whether the first network node supports a query for independent gap configuration.

Aspect 9 is the method of any of aspects 1-8, where the first IE includes a bitmap, where each bit in the bitmap is indicative of whether the first network node supports a feature in the set of first features.

Aspect 10 is the method of any of aspects 1-9, further including: registering with the first network node, where receiving the first message including the first IE includes: receiving the first message including the first IE based on registering with the first network node.

Aspect 11 is an apparatus for wireless communication at a UE including at least one memory and at least one processor coupled to the at least one memory and based at least in part on information stored in the at least one memory, the at least one processor, individually or in any combination, is configured to perform a method in accordance with any of aspects 1-10.

Aspect 12 is an apparatus for wireless communications, including means for performing a method in accordance with any of aspects 1-10.

Aspect 13 is the apparatus of aspect 11 or 12 further including at least one of a transceiver or an antenna coupled to the at least one processor, where the at least one processor is configured to transmit the second message via at least one of the transceiver or the antenna.

Aspect 14 is a computer-readable medium (e.g., a non-transitory computer-readable medium) including instructions that, when executed by at least one processor, cause the at least one processor to perform a method in accordance with any of aspects 1-10.

Aspect 15 is a method of claim wireless communication at a first network node, including: transmitting a first message including a first IE that indicates a set of first features supported by the first network node; and receiving, from a UE, a second message including first UE capability information of the UE based on the first IE included in the first message, where the first UE capability information includes a subset of the set of first features supported by the first network node.

Aspect 16 is the method of aspect 15, where the subset of the set of first features does not include features outside of the set of first features supported by the first network node.

Aspect 17 is the method of aspect 16, where the set of first features includes a set of band combinations, and where the subset of the set of first features does not include band combinations outside of the set of band combinations.

Aspect 18 is the method of any of aspects 15-17, further including: transmitting, for at least one network entity or a CN, the first IE and the first UE capability information of the UE.

Aspect 19 is the method of any of aspects 15-18, where the second message further includes the first IE.

Aspect 20 is the method of aspect 19, further including: receiving, from a CN, a second IE that indicates a set of second features supported by a second network node; and determining that the set of first features supported by the first network node and the set of second features supported by the second network node are not equivalent, where the first message is transmitted based on the determination.

Aspect 21 is the method of aspect 20, where the second IE is received from an AMF of the CN.

Aspect 22 is the method of any of aspects 15-21, where the set of first features includes at least one of: a first indication of whether the first network node supports FBG functionality, a second indication of whether the first network node supports aggregated bandwidth functionality, or a third indication of whether the first network node supports a query for independent gap configuration.

Aspect 23 is the method of any of aspects 15-22, where the first IE includes a bitmap, where each bit in the bitmap is indicative of whether the first network node supports a feature in the set of first features.

Aspect 24 is the method of any of aspects 15-23, further including: registering the UE, where transmitting the first message including the first IE includes: transmitting the first message including the first IE based on registering the UE.

Aspect 25 is an apparatus for wireless communication at a first network node including at least one memory and at least one processor coupled to the at least one memory and based at least in part on information stored in the at least one memory, the at least one processor, individually or in any combination, is configured to perform a method in accordance with any of aspects 15-24.

Aspect 26 is an apparatus for wireless communications, including means for performing a method in accordance with any of aspects 15-24.

Aspect 27 is the apparatus of aspect 25 or 26 further including at least one of a transceiver or an antenna coupled to the at least one processor, where the at least one processor, individually or in any combination, is configured to receive the second message via at least one of the transceiver or the antenna.

Aspect 28 is a computer-readable medium (e.g., a non-transitory computer-readable medium) including instructions that, when executed by at least one processor, cause the at least one processor to perform a method in accordance with any of aspects 15-24.

Aspect 29 is a method of wireless communication at a network entity, including: obtaining, from a first network node, a first IE that indicates a set of first features supported by the first network node and first UE capability information of a UE, where the first UE capability information includes a subset of the set of first features supported by the first network node; and transmitting, for a second network node, the first IE and the first UE capability information in response to receiving a request from the second network node, where the second network node supports a set of second features.

Aspect 30 is the method of aspect 29, further including: obtaining, from the second network node, a second IE that indicates the set of second features supported by the second network node and second UE capability information of the UE, where the second UE capability information includes a second subset of the set of second features supported by the second network node.

Aspect 31 is the method of aspect 30, further including: storing the first IE and the first UE capability information of the UE at an AMF of a CN associated with the network entity; and storing the second IE and the second UE capability information of the UE at the AMF of the CN associated with the network entity.

Aspect 32 is the method of any of aspects 29-31, where the set of first features are equivalent to the set of second features.

Aspect 33 is the method of any of aspects 29-32, where the set of first features and the set of second features differ by at least one feature.

Aspect 34 is the method of any of aspects 29-33, where the set of first features includes at least one of: a first indication of whether the first network node supports FBG functionality, a second indication of whether the first network node supports aggregated bandwidth functionality, or a third indication of whether the first network node supports a query for independent gap configuration.

Aspect 35 is the method of any of aspects 29-34, where the first IE includes a bitmap, where each bit in the bitmap is indicative of whether the first network node supports a feature in the set of first features.

Aspect 36 is the method of any of aspects 29-35, where the subset of the set of first features does not include features outside of the set of first features supported by the first network node.

Aspect 37 is the method of aspect 36, where the set of first features includes a set of band combinations, and where the subset of the set of first features does not include band combinations outside of the set of band combinations.

Aspect 38 is an apparatus for wireless communication at a network entity including at least one memory and at least one processor coupled to the at least one memory and based at least in part on information stored in the at least one memory, the at least one processor, individually or in any combination, is configured to perform a method in accordance with any of aspects 29-37.

Aspect 39 is an apparatus for wireless communications, including means for performing a method in accordance with any of aspects 29-37.

Aspect 40 is a computer-readable medium (e.g., a non-transitory computer-readable medium) including instructions that, when executed by at least one processor, cause the at least one processor to perform a method in accordance with any of aspects 29-37.

What is claimed is:

1. An apparatus for wireless communication at a user equipment (UE), comprising:
   at least one memory; and
   at least one processor coupled to the at least one memory and, based at least in part on information stored in the at least one memory, the at least one processor, individually or in any combination, is configured to:
   receive a first message including a first information element (IE) that indicates a set of first features supported by a first network node, wherein the set of first features comprises at least one of:
   a first indication of whether the first network node supports fallback group (FBG) functionality, or
   a second indication of whether the first network node supports a query for independent gap configuration; and
   transmit, for the first network node, a second message including first UE capability information of the UE based on the first IE included in the first message, wherein the first UE capability information includes a subset of the set of first features supported by the first network node.

2. The apparatus of claim 1, wherein the at least one processor, individually or in any combination, is further configured to:
   refrain from indicating any features outside of the set of first features supported by the first network node.

3. The apparatus of claim 2, wherein the set of first features includes a set of band combinations, and wherein to refrain from indicating any features outside of the set of first features, the at least one processor, individually or in any combination, is configured to:
   refrain from indicating any band combinations outside of the set of band combinations.

4. The apparatus of claim 1, wherein the at least one processor, individually or in any combination, is further configured to:
   determine the first UE capability information of the UE based on the first IE included in the first message, wherein to transmit the second message including the first UE capability information, the at least one processor, individually or in any combination, is configured to: transmit the second message including the first UE capability information based on the determined first UE capability information.

5. The apparatus of claim 4, wherein to determine the first UE capability information of the UE based on the first IE, the at least one processor, individually or in any combination, is configured to:
   determine that the first network node does not support a first feature based on the first IE, wherein the UE supports the first feature; and
   incorporate a second feature in the first UE capability information based on the determination that the first network node does not support the first feature, wherein the first network node supports the second feature.

6. The apparatus of claim 1, wherein the second message further includes the first IE.

7. The apparatus of claim 1, wherein the at least one processor, individually or in any combination, is further configured to:

receive, based on the first UE capability information of the UE, a third message including a second IE that indicates a set of second features supported by a second network node; and transmit, for the second network node, a fourth message including second UE capability information of the UE based on the second IE included in the third message, wherein the second UE capability information includes a second subset of the set of second features supported by the second network node.

8. The apparatus of claim 1, wherein the first IE comprises a bitmap, wherein each bit in the bitmap is indicative of whether the first network node supports a feature in the set of first features.

9. The apparatus of claim 1, wherein the at least one processor, individually or in any combination, is further configured to:

register with the first network node, wherein to receive the first message including the first IE, the at least one processor, individually or in any combination, is configured to: receive the first message including the first IE based on registration with the first network node.

10. The apparatus of claim 1, further comprising at least one of a transceiver or an antenna coupled to the at least one processor, wherein to transmit the second message, the at least one processor, individually or in any combination, is configured to transmit the second message via at least one of the transceiver or the antenna.

11. An apparatus for wireless communication at a first network node, comprising:

at least one memory; and at least one processor coupled to the at least one memory and, based at least in part on information stored in the at least one memory, the at least one processor, individually or in any combination, is configured to:

transmit a first message including a first information element (IE) that indicates a set of first features supported by the first network node, wherein the set of first features comprises at least one of:

a first indication of whether the first network node supports fallback group (FBG) functionality, or a second indication of whether the first network node supports a query for independent gap configuration; and receive, from a user equipment (UE), a second message including first UE capability information of the UE based on the first IE included in the first message, wherein the first UE capability information includes a subset of the set of first features supported by the first network node.

12. The apparatus of claim 11, wherein the subset of the set of first features does not include features outside of the set of first features supported by the first network node.

13. The apparatus of claim 11, wherein the set of first features includes a set of band combinations, and wherein the subset of the set of first features does not include band combinations outside of the set of band combinations.

14. The apparatus of claim 11, wherein the at least one processor, individually or in any combination, is further configured to:

transmit, for at least one network entity or a core network (CN), the first IE and the first UE capability information of the UE.

15. The apparatus of claim 11, wherein the second message further includes the first IE.

16. The apparatus of claim 15, wherein the at least one processor, individually or in any combination, is further configured to:

receive, from a core network (CN), a second IE that indicates a set of second features supported by a second network node; and determine that the set of first features supported by the first network node and the set of second features supported by the second network node are not equivalent, wherein the at least one processor, individually or in any combination, is configured to transmit the first message based on the determination.

17. The apparatus of claim 16, wherein the at least one processor, individually or in any combination, is configured to receive the second IE from an access and mobility management function (AMF) of the CN.

18. The apparatus of claim 11, wherein the first IE comprises a bitmap, wherein each bit in the bitmap is indicative of whether the first network node supports a feature in the set of first features.

19. The apparatus of claim 11, wherein the at least one processor, individually or in any combination, is further configured to:

register the UE, wherein to transmit the first message including the first IE, the at least one processor, individually or in any combination, is configured to: transmit the first message including the first IE based on registration of the UE.

20. The apparatus of claim 11, further comprising at least one of a transceiver or an antenna coupled to the at least one processor, wherein to receive the second message, the at least one processor, individually or in any combination, is configured to receive the second message via at least one of the transceiver or the antenna.

21. An apparatus for wireless communication at a network entity, comprising:

at least one memory; and at least one processor coupled to the at least one memory and, based at least in part on information stored in the at least one memory, the at least one processor, individually or in any combination, is configured to:

obtain, from a first network node, a first information element (IE) that indicates a set of first features supported by the first network node and first user equipment (UE) capability information of a UE, wherein the first UE capability information includes a subset of the set of first features supported by the first network node, and wherein the set of first features comprises at least one of:

a first indication of whether the first network node supports fallback group (FBG) functionality, or a second indication of whether the first network node supports a query for independent gap configuration; and transmit, for a second network node, the first IE and the first UE capability information in response to a reception of a request from the second network node, wherein the second network node supports a set of second features.

22. The apparatus of claim 21, wherein the at least one processor, individually or in any combination, is further configured to:

obtain, from the second network node, a second IE that indicates the set of second features supported by the second network node and second UE capability information of the UE, wherein the second UE capability information includes a second subset of the set of second features supported by the second network node.

23. The apparatus of claim 22, wherein the at least one processor, individually or in any combination, is further configured to:

store the first IE and the first UE capability information of the UE at an access and mobility management function (AMF) of a core network (CN) associated with the network entity; and store the second IE and the second UE capability information of the UE at the AMF of the CN associated with the network entity.

24. The apparatus of claim 21, wherein the set of first features are equivalent to the set of second features.

25. The apparatus of claim 21, wherein the set of first features and the set of second features differ by at least one feature.

26. The apparatus of claim 21, wherein the first IE comprises a bitmap, wherein each bit in the bitmap is indicative of whether the first network node supports a feature in the set of first features.

27. A method of wireless communication at a user equipment (UE), comprising:

receiving a first message including a first information element (IE) that indicates a set of first features supported by a first network node, wherein the set of first features comprises at least one of:

a first indication of whether the first network node supports fallback group (FBG) functionality, or a second indication of whether the first network node supports a query for independent gap configuration; and transmitting, for the first network node, a second message including first UE capability information of the UE based on the first IE included in the first message, wherein the first UE capability information includes a subset of the set of first features supported by the first network node.

* * * * *